United States Patent
Goodman et al.

(10) Patent No.: US 11,089,740 B2
(45) Date of Patent: Aug. 17, 2021

(54) GREEN WALL MODULAR SYSTEM

(71) Applicant: DELOS LIVING LLC, New York, NY (US)

(72) Inventors: Bruce Goodman, Brooklyn, NY (US); Richard A. Macary, New York, NY (US); Max A. Pollinger, New York, NY (US); Trevor S. Granger, New York, NY (US)

(73) Assignee: Delos Living LLC, New York, NY (US)

(*) Notice: Subject to any disclaimer, the term of this patent is extended or adjusted under 35 U.S.C. 154(b) by 766 days.

(21) Appl. No.: 15/576,223

(22) PCT Filed: May 26, 2016

(86) PCT No.: PCT/US2016/034416
§ 371 (c)(1),
(2) Date: Nov. 21, 2017

(87) PCT Pub. No.: WO2016/191596
PCT Pub. Date: Dec. 1, 2016

(65) Prior Publication Data
US 2018/0206414 A1     Jul. 26, 2018

Related U.S. Application Data

(60) Provisional application No. 62/166,559, filed on May 26, 2015.

(51) Int. Cl.
*A01G 9/02*     (2018.01)
*A01G 7/04*     (2006.01)
(Continued)

(52) U.S. Cl.
CPC ............. *A01G 9/025* (2013.01); *A01G 7/045* (2013.01); *A01G 9/022* (2013.01); *A01G 9/247* (2013.01);
(Continued)

(58) Field of Classification Search
CPC ........ A01G 9/022; A01G 9/025; A47G 7/044; A47G 7/045
(Continued)

(56) References Cited

U.S. PATENT DOCUMENTS

| 780,627 A | 1/1905 | Umbehend |
| 1,648,277 A | 11/1927 | Korb |

(Continued)

FOREIGN PATENT DOCUMENTS

| CA | 2 740 939 A1 | 3/2010 |
| CN | 202551821 U | 11/2012 |

(Continued)

OTHER PUBLICATIONS

GSky Plant Systems, Inc., "Smart Wall Cabinet," retrieved from http://gsky.com/green-walls/smartwall/, retrieved on Apr. 29, 2015, 3 pages.
(Continued)

*Primary Examiner* — Peter M Poon
*Assistant Examiner* — Danielle A Clerkley
(74) *Attorney, Agent, or Firm* — Fitch, Even, Tabin & Flannery, LLP

(57) ABSTRACT

A green wall system includes a plurality of potted plants positioned within respective pots to form a wall of vegetation. The pots can be mounted to a support element and plumbing and electrical utilities of the green wall system can be positioned within a utility column adjacent to the wall of vegetation. The utility column can span from a bottom of the green wall system to a top of the green wall system. A fluid
(Continued)

reservoir and a pump to pump fluid from the reservoir to the potted plants can be positioned within the utility column.

40 Claims, 16 Drawing Sheets

(51) Int. Cl.
  *A01G 9/24* (2006.01)
  *A01G 27/02* (2006.01)
  *A01G 9/26* (2006.01)
(52) U.S. Cl.
  CPC ............ *A01G 27/02* (2013.01); *A01G 9/26* (2013.01); *Y02P 60/20* (2015.11)
(58) Field of Classification Search
  USPC .................... 47/65.5, 82, 83, 65.9
  See application file for complete search history.

(56) References Cited

U.S. PATENT DOCUMENTS

| | | | |
|---|---|---|---|
| 4,059,922 A | 11/1977 | Digiacinto | |
| 4,218,847 A | 8/1980 | Leroux | |
| 4,255,896 A | 3/1981 | Carl | |
| 4,255,897 A * | 3/1981 | Ruthner | A01G 9/249 |
| | | | 47/65 |
| 4,415,450 A | 11/1983 | Wolverton | |
| D295,934 S | 5/1988 | Dyrhood | |
| 4,869,019 A | 9/1989 | Ehrlich | |
| 4,959,084 A | 9/1990 | Wolverton | |
| D312,018 S | 11/1990 | Giesy | |
| 4,976,064 A | 12/1990 | Julien | |
| 5,137,625 A | 8/1992 | Wolverton | |
| D335,978 S | 6/1993 | Grahn et al. | |
| 5,217,696 A | 6/1993 | Wolverton | |
| 5,269,094 A | 12/1993 | Wolverton | |
| 5,276,997 A | 1/1994 | Swearengin | |
| 5,277,877 A | 1/1994 | Jeffrey | |
| D345,071 S | 3/1994 | Gould | |
| 5,351,438 A | 10/1994 | Wolverton | |
| 5,394,647 A | 3/1995 | Blackford, Jr. | |
| 5,397,382 A | 3/1995 | Anderson | |
| 5,407,470 A | 4/1995 | Jutzi | |
| 5,433,923 A | 7/1995 | Wolverton et al. | |
| 5,440,836 A | 8/1995 | Lee | |
| D364,762 S | 12/1995 | Compton et al. | |
| D365,484 S | 12/1995 | Trattner, Jr. et al. | |
| 5,501,037 A | 3/1996 | Aldokimov | |
| 5,533,302 A | 7/1996 | Lynch | |
| 5,724,768 A | 3/1998 | Ammann, Jr. | |
| D396,581 S | 8/1998 | Schubert | |
| D401,085 S | 11/1998 | Grant | |
| 5,887,383 A | 3/1999 | Soeda | |
| 5,918,416 A | 7/1999 | Ammann, Jr. | |
| 5,937,575 A | 8/1999 | Zobel | |
| 6,000,173 A | 12/1999 | Schow | |
| 6,021,602 A | 2/2000 | Orsi | |
| D424,356 S | 5/2000 | Hahn | |
| 6,105,309 A | 8/2000 | Takayanagi | |
| 6,230,437 B1 | 5/2001 | Wolverton | |
| 6,293,048 B1 | 9/2001 | Boulter | |
| 6,477,805 B2 | 11/2002 | Ware | |
| 6,499,249 B1 | 12/2002 | Luijkx | |
| D477,158 S | 7/2003 | Calcerano et al. | |
| 6,615,542 B2 | 9/2003 | Ware | |
| 6,634,138 B2 | 10/2003 | Katzman | |
| 6,727,091 B2 | 4/2004 | Darlington | |
| 6,786,002 B2 | 9/2004 | Prescott | |
| 6,840,008 B1 | 1/2005 | Bullock | |
| 7,055,282 B2 | 6/2006 | Bryan, III | |
| D526,512 S | 8/2006 | Hahn | |
| D530,940 S | 10/2006 | Raile | |
| 7,243,460 B2 | 7/2007 | Darlington | |
| D566,428 S | 4/2008 | Kester | |
| 7,516,574 B2 | 4/2009 | Gottlieb | |
| 7,634,872 B2 | 12/2009 | Prescott | |
| 7,788,848 B1 * | 9/2010 | Koumoudis | A01G 9/025 |
| | | | 47/65.9 |
| 7,823,328 B2 | 11/2010 | Walhovd | |
| D632,102 S | 2/2011 | Sato | |
| 7,877,927 B2 | 2/2011 | Roy | |
| D634,952 S | 3/2011 | Gile | |
| 7,937,891 B2 | 5/2011 | Benfey | |
| 8,083,835 B2 | 12/2011 | Mittelmark | |
| 8,136,296 B2 | 3/2012 | Hogan | |
| 8,181,391 B1 | 5/2012 | Giacomantonio | |
| 8,225,549 B2 | 7/2012 | Simmons | |
| D666,123 S | 8/2012 | Sichello | |
| 8,250,809 B2 | 8/2012 | Simmons | |
| 8,312,673 B2 | 11/2012 | Benfey | |
| 8,365,466 B1 | 2/2013 | Storey | |
| 8,454,729 B2 | 6/2013 | Mittelmark | |
| 8,505,238 B2 | 8/2013 | Luebbers | |
| 8,516,742 B1 | 8/2013 | Azoulay | |
| 8,549,788 B2 | 10/2013 | Bryan, III | |
| 8,621,782 B2 | 1/2014 | Buck | |
| 8,667,734 B2 | 3/2014 | Johnson | |
| 8,707,619 B2 | 4/2014 | Edwards | |
| 8,726,568 B2 | 5/2014 | Wilson | |
| 8,869,447 B2 | 10/2014 | Benfey | |
| 8,881,454 B2 | 11/2014 | Janney | |
| 8,894,741 B2 | 11/2014 | Mittelmark | |
| 8,904,705 B2 | 12/2014 | Downs, Sr. | |
| 8,915,016 B2 | 12/2014 | Wilson | |
| 8,950,111 B2 | 2/2015 | Soejima | |
| 8,966,819 B1 | 3/2015 | Cosmann | |
| 9,004,298 B2 | 4/2015 | Sichello | |
| 9,010,019 B2 | 4/2015 | Mittelmark | |
| D734,958 S | 7/2015 | Gosling et al. | |
| D737,078 S | 8/2015 | McKinney | |
| 9,101,099 B2 | 8/2015 | Nagels | |
| 9,125,351 B2 | 9/2015 | Wu | |
| 9,210,846 B2 | 12/2015 | Vanlente | |
| 9,220,207 B2 | 12/2015 | Storey | |
| 9,226,457 B2 | 1/2016 | Laurence | |
| 9,258,953 B2 | 2/2016 | Wilson | |
| 9,277,696 B2 | 3/2016 | Wilson | |
| 9,288,951 B2 | 3/2016 | Hansen | |
| 9,345,207 B2 | 5/2016 | Juncal | |
| 9,357,715 B2 | 6/2016 | Cottrell | |
| 9,374,951 B2 | 6/2016 | Church | |
| D761,598 S | 7/2016 | Goodman | |
| 9,578,819 B2 | 2/2017 | Prescott | |
| 2001/0047617 A1 | 12/2001 | Blossom | |
| 2003/0213170 A1 | 11/2003 | Snead | |
| 2003/0217507 A1 | 11/2003 | Wolverton | |
| 2005/0214756 A1 | 9/2005 | Karan et al. | |
| 2006/0168882 A1 | 8/2006 | Hashimoto | |
| 2007/0113472 A1 | 5/2007 | Plowman | |
| 2008/0000153 A1 | 1/2008 | Sugiyama et al. | |
| 2009/0000189 A1 | 1/2009 | Black | |
| 2009/0223126 A1 | 9/2009 | Garner et al. | |
| 2009/0293357 A1 | 12/2009 | Vickers | |
| 2009/0313894 A1 | 12/2009 | Bieber | |
| 2010/0037517 A1 | 2/2010 | Copping et al. | |
| 2010/0095586 A1 | 4/2010 | Sichello | |
| 2010/0139160 A1 | 6/2010 | Hirsh | |
| 2010/0146855 A1 | 6/2010 | Ma | |
| 2011/0093122 A1 * | 4/2011 | Koumoudis | A01G 9/025 |
| | | | 700/284 |
| 2011/0225883 A1 | 9/2011 | Clifford | |
| 2011/0258925 A1 | 10/2011 | Baker | |
| 2012/0036774 A1 * | 2/2012 | Peleszezak | A01G 9/025 |
| | | | 47/66.6 |
| 2012/0066972 A1 | 3/2012 | Lin | |
| 2012/0167460 A1 * | 7/2012 | Omidi | A01G 25/165 |
| | | | 47/65.7 |
| 2012/0279120 A1 | 11/2012 | Prescott | |
| 2012/0298599 A1 | 11/2012 | Sichello | |
| 2013/0118070 A1 | 5/2013 | Marquez | |
| 2013/0133260 A1 * | 5/2013 | Solano Cabello | A01G 9/025 |
| | | | 47/62 R |
| 2013/0145690 A1 | 6/2013 | Cannon | |

(56) References Cited

U.S. PATENT DOCUMENTS

| | | |
|---|---|---|
| 2013/0180172 A1* | 7/2013 | Silverberg ............. A01G 9/022 47/65 |
| 2013/0297335 A1 | 11/2013 | Mittelmark |
| 2013/0340337 A1 | 12/2013 | Kuo |
| 2014/0000162 A1 | 1/2014 | Blank |
| 2014/0000163 A1 | 1/2014 | Lin |
| 2014/0190078 A1 | 7/2014 | Kim |
| 2014/0283450 A1 | 9/2014 | Darlington |
| 2014/0298719 A1 | 10/2014 | Mackin |
| 2014/0318011 A1 | 10/2014 | Järvinen et al. |
| 2015/0223418 A1 | 8/2015 | Collins |
| 2015/0296724 A1 | 10/2015 | Martinez Ruanova |
| 2015/0319947 A1 | 11/2015 | Smith |
| 2015/0334930 A1 | 11/2015 | Stoltzfus |
| 2016/0029580 A1 | 2/2016 | Sakai |
| 2016/0037738 A1 | 2/2016 | Kato |
| 2016/0044879 A1 | 2/2016 | Hamlin |
| 2016/0066525 A1 | 3/2016 | Duquesnay |
| 2016/0128288 A1 | 5/2016 | Pettinelli |
| 2016/0135393 A1 | 5/2016 | Martinez Ruanova |
| 2016/0135394 A1 | 5/2016 | Wagner |
| 2016/0183488 A1 | 6/2016 | Yano |
| 2016/0198652 A1 | 7/2016 | Yano |

FOREIGN PATENT DOCUMENTS

| | | | |
|---|---|---|---|
| EP | 1367334 A1 | 12/2003 | |
| EP | 2644025 A1 | 10/2013 | |
| EP | 2845466 A1 | 3/2015 | |
| FR | 2967550 A1 * | 5/2012 | ............... A01G 9/02 |
| JP | 2010-239878 A | 10/2010 | |
| KR | 10-0771486 B1 | 10/2007 | |
| KR | 10-1102733 B1 | 1/2012 | |
| KR | 10-1135926 B1 | 4/2012 | |
| KR | 1020130117366 A | 10/2013 | |
| KR | 2015-23106 B * | 3/2015 | ............... A01G 9/00 |
| WO | 2010/134777 A2 | 11/2010 | |
| WO | 2012/058570 A2 | 5/2012 | |
| WO | 2013/014337 A2 | 1/2013 | |
| WO | 2013082847 A1 | 6/2013 | |
| WO | 2013128049 A1 | 9/2013 | |
| WO | 2013150255 A1 | 10/2013 | |
| WO | 2014102553 A1 | 7/2014 | |
| WO | 2014/123722 A1 | 8/2014 | |
| WO | 2014/167576 A1 | 10/2014 | |
| WO | 2014/169707 A | 10/2014 | |
| WO | 2014179630 A2 | 11/2014 | |
| WO | 2016108031 A1 | 7/2016 | |

OTHER PUBLICATIONS

International Search Report and Written Opinion of the International Searching Authority, dated Aug. 29, 2016, for International Application No. PCT/US2016/034416, 22 pages.

NaturVention, "Science," URL=https://www.naturvention.com/technology-and-science/science/, download date Apr. 5, 2016, 4 pages.

NaturVention, "Technology," URL=https://www.naturvention.com/technology-and-science/, download date Apr. 5, 2016, 6 pages.

Extended European Search Report issued in corresponding European Application No. 16800740.9 dated Jan. 3, 2019 (9 pages).

* cited by examiner

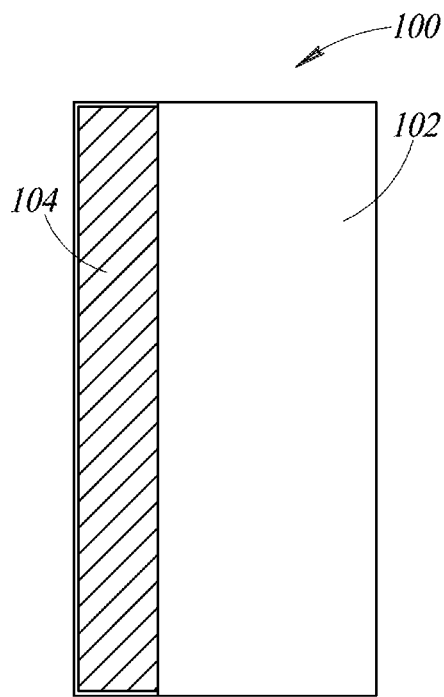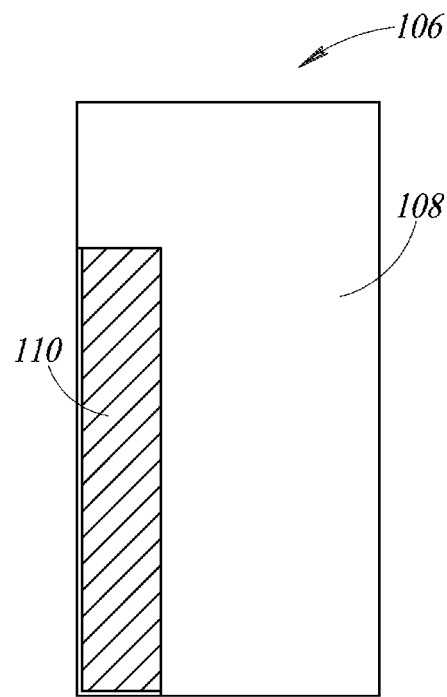
FIG. 7  FIG. 8
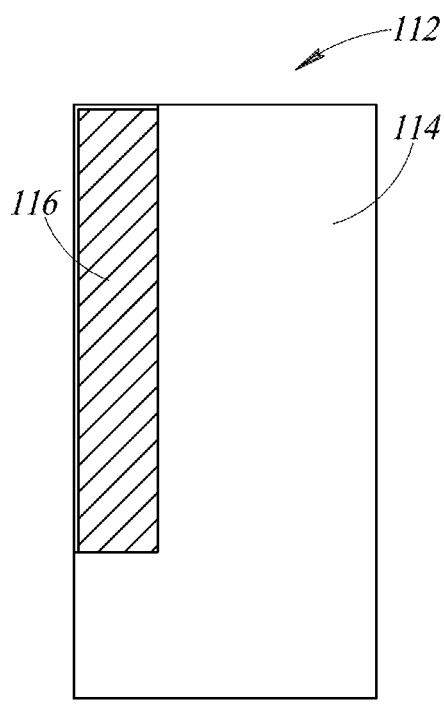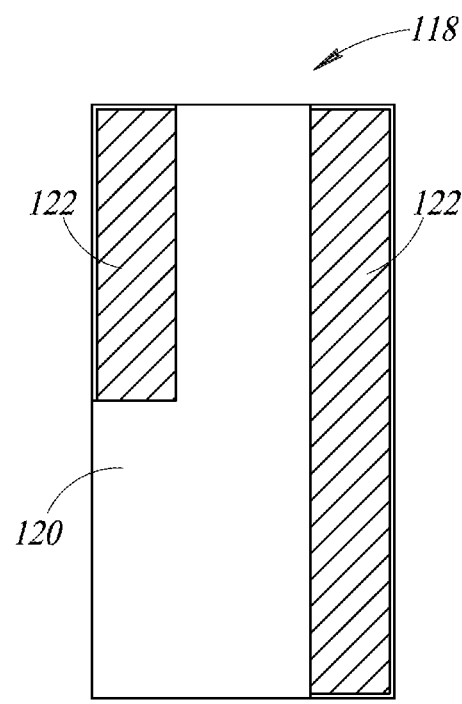
FIG. 9  FIG. 10

GREEN WALL MODULAR SYSTEM

CROSS-REFERENCE TO RELATED APPLICATIONS

This application is a U.S. national phase application filed under 35 U.S.C. § 371 of International Application Number PCT/US2016/034416, filed May 26, 2016, designating the United States, which claims priority to provisional application U.S. Patent Application No. 62/166,559, filed on May 26, 2015.

BACKGROUND

Technical Field

The present disclosure generally relates to green wall systems that include a plurality of potted plants arranged to form a wall of vegetation.

Description of the Related Art

Various green wall systems have been developed. Green wall systems can be advantageous or desirable for various reasons, including improved aesthetics at an installation location. Incorporating vegetation into living space can also help to cleanse the air of the living space. For example, U.S. patent application publication 2014/0283450 discloses an "in-room hydroponic air cleansing unit." Planting systems that include evaporative irrigation techniques have also been developed. For example, U.S. patent application publication 2012/0279120 discloses a "subsurface heat actuated evaporative irrigation method and system." Some previous green wall systems were designed to be coupled or hardwired into a building's internal electrical, plumbing, or HVAC systems.

BRIEF SUMMARY

A green wall system may be summarized as including: a support element to which a plurality of pots can be detachably coupled; a utility column extending from a bottom of the green wall system to a top of the green wall system; a fluid reservoir positioned within the utility column; and a pump positioned within the utility column.

The pump may be coupled to the fluid reservoir to pump fluid from the fluid reservoir to each of the pots when the pots are coupled to the support element. The green wall system may further include a fluid distribution system coupled to the pump to carry fluid from the pump to each of the pots when the pots are coupled to the support element. The support element may include a plurality of rails. The green wall system may further include a plurality of pots mounted to each of the rails. The green wall system may further include a potted plant in each of the pots. The green wall system may further include a vertical strip lighting assembly positioned to provide light to the potted plants.

The green wall system may further include a first vertical strip lighting assembly positioned between a first column of the pots and a second column of the pots; and a second vertical strip lighting assembly positioned between a third column of the pots and a fourth column of the pots. The green wall system may further include a diaphragm pump positioned within the utility column. The green wall system may further include a backlit acrylic panel in a front portion of the utility column. The pots may be mounted to the support element using mounting brackets. The green wall system may further include an electric cord to plug the green wall system into a standard outlet.

The green wall system may further include a network of at least one sensor. The network of at least one sensor may include a sensor to measure at least one parameter selected from the group consisting of: environmental humidity, temperature, light, TVOC, formaldehyde, benzene, toluene, $CO_2$, and airborne particulate matter. The network of at least one sensor may include a sensor to measure at least one parameter selected from the group consisting of: a moisture level, a pH level, and a temperature of soil within the pots. The green wall system may be configured to dynamically adjust one or more operating parameters based on output provided by the network of sensors. The operating parameters may include an air flow rate and a frequency at which the pump is operated. The green wall system may further include a display configured to display output provided by the network of sensors.

A green wall apparatus may be summarized as including a support element to which a plurality of pots can be detachably coupled; and a fluid reservoir positioned behind the support element and behind the pots when the pots are detachably coupled to the support element.

The green wall apparatus may further include a pump coupled to the fluid reservoir to pump fluid from the fluid reservoir to each of the pots when the pots are coupled to the support element. The support element may include a plurality of rails.

A method of maintaining a green wall system may be summarized as including: receiving a signal from the green wall system that a fluid reservoir within a utility column of the green wall system is in need of re-filling; opening an access panel of the utility column; re-filling the fluid reservoir; and closing the access panel.

The method may consist of: receiving the signal from the green wall system that the fluid reservoir within the utility column of the green wall system is in need of re-filling; opening the access panel of the utility column; re-filling the fluid reservoir; and closing the access panel.

A green wall system may be summarized as comprising: a plant support frame to which a plurality of plants can be detachably coupled, wherein the plurality of plants delineate a green wall area which is viewable from at least a front of the green wall system, the green wall area populated with plants when the plants are detachably coupled to the plant support frame; a utility column adjacent to the plant support frame, the utility column having a front face, wherein the front face is a major surface of the utility column which is viewable from at least the front of the green wall system, wherein the green wall area is larger than the front face of the utility column; and a fluid reservoir positioned within the utility column and fluidly coupleable to provide fluid to the plants when the plants are detachably coupled to the plant support frame.

A green wall system may be summarized as comprising: a plant support frame that delineates a green wall area having a width and a height and which is viewable from at least a front of the green wall system, the plant support frame comprising a number of supports to which planters are detachably coupleable, the planters having receptacles to hold plants at various locations in the green wall area; a utility column physically adjacent to the plant support frame, the utility column having a front face having a width and a height and which is viewable from at least the front of the green wall system, the width dimension of green wall area greater than the width of the front face of the utility column; and a fluid reservoir positioned within the utility column and fluidly coupleable to provide fluid to the plants when the plants are detachably coupled to the plant support frame.

The plant support frame may have a front edge and a back, and the plant support frame may have a depth that extends perpendicularly with respect to the green wall area from the front edge to the back to delineate a green wall volume. The front edge of the plant support frame may define a front plane and the front face of the utility column may be parallel to the front plane defined by the front edge of the plant support frame. The front plane of the plant support frame and the front face of the utility column may be coplanar. The planters may be positioned rearwardly from the front plane when coupled to the supports. The number of supports may comprise a plurality of horizontal rails, the rails spaced vertically from one another in the green wall area.

The green wall system may further comprise at least one hinge that physically pivotally couples at least one portion of the utility column to the plant support frame, the at least one portion of the utility column may be pivotable between an open position which provides access to an interior of the utility column from an exterior thereof and a closed position in which access to the interior of the utility column from the exterior thereof is blocked. The green wall system may further comprise one or more pumps positioned within the utility column and fluidly coupled to the fluid reservoir. The utility column may be physically coupled to the plant support frame. The green wall area may be a rectangular area and the front face of the utility column may be rectangular, and the green wall area may have a respective aspect ratio defined as a ratio of a height of the plant support frame and a width of the plant support frame, and the front face of the utility column may have a respective aspect ratio defined as a ratio of a height of the front face and a width of the front face, and the respective aspect ratio of the plant support frame may be smaller than the respective aspect ratio of the front face of the utility column.

The green wall system may further comprise a display screen mounted to the utility column and viewable from at least the front of the green wall system, or a touch panel display screen mounted to the utility column and viewable from at least the front of the green wall system. The front face of the utility column may bear signage. The utility column may have a second face that is coplanar with the front face. The utility column may have a second face that is not coplanar with the front face. The utility column may have a second face that has a smaller surface area than the front face. The utility column may have a second face that has a surface area approximately the same size as the front face.

The green wall area may have the same shape as the front face of the utility column. The green wall area may have a different shape than the front face of the utility column. A longest dimension of the green wall area may be longer than a longest dimension of the front face of the utility column. A longest dimension of the green wall area may be shorter than a longest dimension of the front face of the utility column. The utility column may have a second face that is separate from the front face, the second face viewable from at least the front of the green wall system. The front face and the second face may have the same shape. The front face and the second face may have the same dimensions. The front face and the second face may have different shapes. The front face and the second face may have different surface coatings. The front face and the second face may have different surface textures. The front face and the second face may have different surface colors. The front face and the second face may have different surface construction materials. The front face may have a shape including a first number of corners and the second face may have a shape including a second number of corners matching the first number of corners. The front face may have a shape including a first number of corners and the second face may have a shape including a second number of corners different than the first number of corners.

The front face may extend from a first location located proximate a bottom of the green wall system to a second location located proximate a top of the green wall system. Proximate the bottom of the green wall system may be less than forty-five, thirty-five, twenty-five, twenty, fifteen, ten, or five percent of a height of the green wall system from the bottom of the green wall system and proximate the top of the green wall system may be less than forty-five, thirty-five, twenty-five, twenty, fifteen, ten, or five percent of the height of the green wall system from the top of the green wall system.

The front face may extend from a first location located proximate a first side of the green wall system to a second location located proximate a second side of the green wall system. Proximate the first side of the green wall system may be less than forty-five, thirty-five, twenty-five, twenty, fifteen, ten, or five percent of a width of the green wall system from the first side of the green wall system and proximate the second side of the green wall system may be less than forty-five, thirty-five, twenty-five, twenty, fifteen, ten, or five percent of the width of the green wall system from the second side of the green wall system.

The front face may extend from a first location located proximate a first side of the green wall system toward a second side of the green wall system and from a second location located proximate a bottom of the green wall system toward a top of the green wall system. Proximate the first side of the green wall system may be less than forty-five, thirty-five, twenty-five, twenty, fifteen, ten, or five percent of a width of the green wall system from the first side of the green wall system and proximate the bottom of the green wall system may be less than forty-five, thirty-five, twenty-five, twenty, fifteen, ten, or five percent of a height of the green wall system from the bottom of the green wall system.

The green wall area may be twice, three times, four times, or five times as large as the front face. The front face may be twice, three times, four times, or five times as large as the green wall area. A longest dimension of the green wall area may be parallel to a longest dimension of the front face of the utility column. A longest dimension of the green wall area may be oblique to a longest dimension of the front face of the utility column. The front face may have a shape including a first number of corners and the green wall area may have a shape including a second number of corners matching the first number of corners. The front face may have a shape including a first number of corners and the green wall area may have a shape including a second number of corners less than the first number of corners. The front face may have a shape including a first number of corners and the green wall area may have a shape including a second number of corners greater than the first number of corners.

The front face may have a concave shape including an indented portion. The front face may include a sensor. The front face may include a light source. The front face may include a speaker. The front face may include a curved portion of the utility column. The green wall area may include a curved portion of the plant support frame. The front face may include an angled portion of the utility column. The green wall area may include an angled portion of the plant support frame.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

FIG. 7 illustrates another green wall system, according to at least one illustrated embodiment.

FIG. 8 illustrates another green wall system, according to at least one illustrated embodiment.

FIG. 9 illustrates another green wall system, according to at least one illustrated embodiment.

FIG. 10 illustrates another green wall system, according to at least one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

Figure 1:
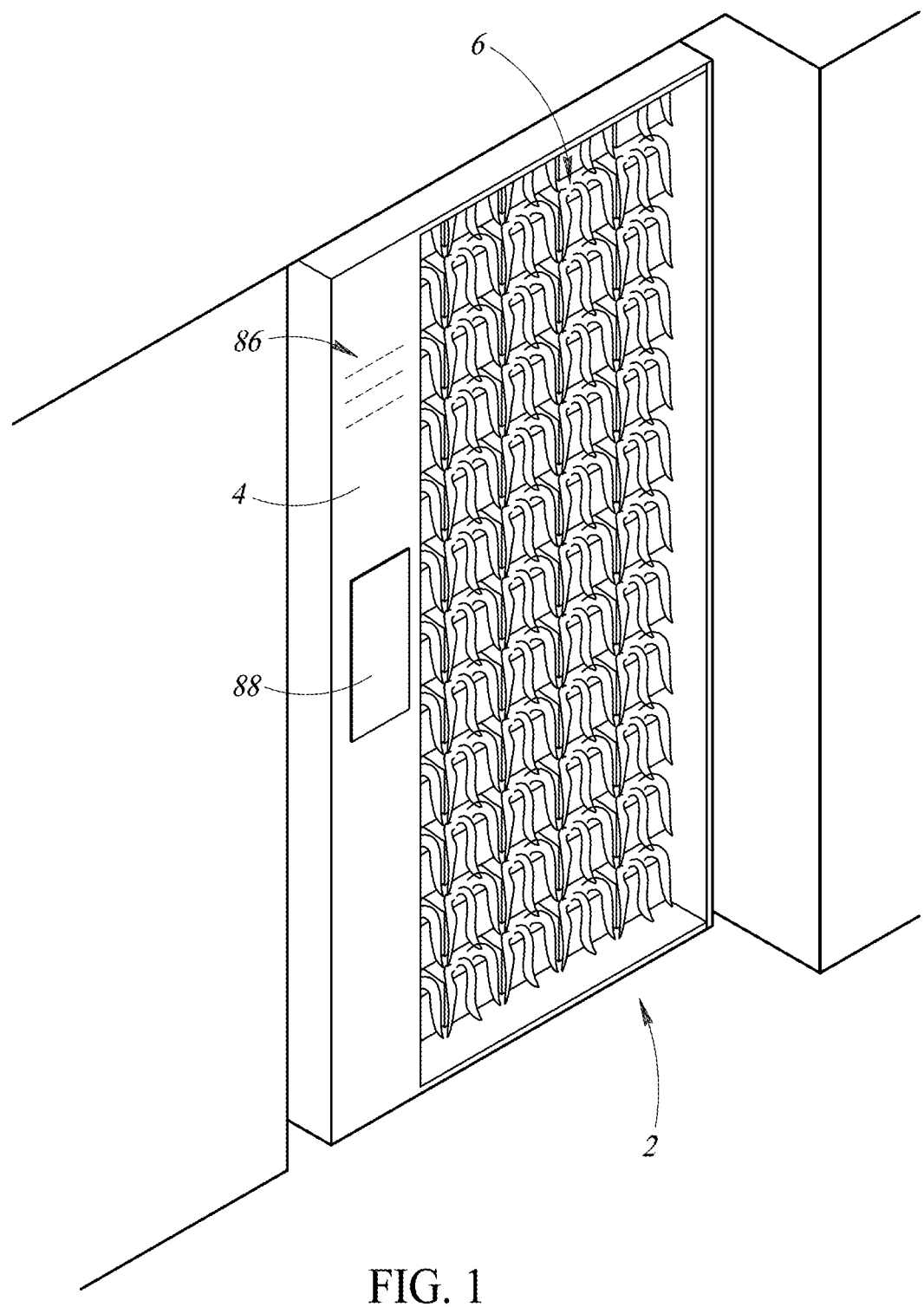
FIG. 1 is an illustration of a green wall system installed at a first installation location, according to at least one illustrated embodiment.

FIG. 1 illustrates a green wall system 2 installed at an installation location. The installation location of FIG. 1 is a hallway of a hotel, but the green wall system 2 can be installed at various suitable installation locations, such as at office buildings, retail locations, residences, elevators, entertainment venues, air, rail, or bus transportation facilities, etc. As examples, the green wall system 2 can be installed in residential settings such as within a single family home or in the lobby of an apartment complex. The green wall system 2 can also be installed in commercial settings, such as within office meeting rooms or lobbies, or against one or more walls of office spaces. The green wall system 2 can also be installed in medical settings, such as at hospitals. The green wall system 2 can be installed indoors, such as against an internal wall of a building, or outdoors, such as against an external wall of a building. In general, the green wall system 2 can be installed at any location that has enough physical space to accommodate the green wall system 2 and that has a power outlet or receptacle, such as a standard North American 120 volt, 60 Hz outlet or a standard European outlet.

The green wall system 2 comprises one or more unitary self-contained or modular units that may be packaged, shipped, and installed without the use of any other components or specialized equipment. The green wall system 2 can be free-standing or can be mounted or otherwise attached to a wall of an installation location using mounting brackets to secure the green wall system 2 to prevent it from tipping over. The green wall system 2 can be installed without the use of skilled laborers such as electricians, plumbers, HVAC specialists, or other tradesmen, and can be installed simply by positioning the green wall system 2 at an installation location and plugging it in to an outlet. For example, the green wall system 2 includes a fluid reservoir such as a soft, water-proof bladder for holding a fluid such as water to irrigate plants within the green wall system 2, so that the green wall system 2 does not need to be coupled to an external water source such as an external reservoir or the plumbing of a building at the installation location. As described in greater detail below, the green wall system 2 also includes fans, lights, pumps, and internal piping so that the green wall system 2 is ready for use upon installation.

The green wall system 2 includes a hollow side wall or utility column 4 which can house the infrastructure, or many other components, of the green wall system 2, such as various electrical or plumbing components of the green wall system 2. The utility column 4 can be relatively tall (e.g., along an axis spanning from a bottom of the system 2 proximate the floor of the installation location to a top of the system 2 proximate the ceiling of the installation location), relatively narrow (e.g., along an axis spanning from a left side portion of the system 2 to a right side portion of the system 2 when viewing the system 2 from the front), and relatively shallow (e.g., along an axis spanning from a front portion of the system 2 to a rear portion of the system 2). The utility column 4 is a structural shell that encloses, protects, and hides other components of the green wall system 2. The utility column 4 has a height that spans from a bottom of the green wall system 2 to a top of the green wall system 2.

The green wall system 2 also includes a plurality of pots 30 (see FIGS. 4 and 5) configured to receive respective potted plants 6. The pots 30 can include soil, beneficial bacteria, and the plants 6 themselves. The pots 30 and potted plants 6 can be arranged in rows or columns extending laterally away from and to the right of the utility column 4. Alternatively, the pots 30 and potted plants 6 can be arranged to extend to the left of the utility column, if such an arrangement is suitable for a particular installation location. The green wall system 2 includes pots 30 and respective potted plants 6 arranged in a grid of 12 rows and 6 columns, and in alternative embodiments, green wall systems can include potted plants 6 arranged in a grid of any number of rows and any number of columns. The potted plants can all be of the same variety, or can be of different varieties, as is desired for a given installation location.

The soil used in the pots 30 can be selected based on the varieties of plants 6 to be potted in the pots 30. The soil can include microbes selected based on the varieties of plants 6 to be potted in the pots 30, such as to promote health, appearance, or growth of the plants 6, or to promote the ability of the green wall system 2 to filter toxins out of the air at the installation location, such as through biofiltration or phytoremediation. The soil can include custom bacterial infusions or inoculations such as of *hyphomicrobium, arthrobacter aurescens*, or of other microbes, thereby priming the soil to target specific pollutants or groups of pollutants to generally improve the air cleaning capacity of the green wall system 2. The soil or other growing media and the microbes included therein can be selected to reduce or eliminate the need to fertilize the soil, or to reduce the frequency at which fertilization is performed. Thus, the soil can be a curated soil.

Each pot 30 can include one or more potted plants 6. In some cases, each pot 30 includes a single one or very few of the potted plants 6, so that the potted plants 6 can have their own soil and their own microbial environment so that competition by the potted plants 6 for nutrients is reduced or eliminated. Thus, the potted plants 6 can be healthier and grow larger. Further, individual potted plants 6 can be replaced with relative ease, such as by removing and replacing the respective pot 30. For example, if one of the potted plants 6 dies, or if the potted plant 6 is desired to be replaced with a new species of potted plant 6, its pot 30 can simply be removed from the green wall system 30 and replaced with another pot 30 and respective potted plant 6.

The green wall system 2 can provide numerous benefits at its installation location. For example, the green wall system 2 can improve the aesthetics of the installation location. As another example, the green wall system 2 can filter $CO_2$, VOCs, toxins, contaminants, and odors out of the air at the installation location, such as through phytoremediation. As other examples, the green wall system 2 can increase humidity and the concentration of $O_2$ gas at the installation location. Some or all of these benefits can lead to further advantages, such as decreases in HVAC costs and increases in the productivity or general well-being of people at the installation location. The green wall system 2 can also provide acoustic damping, reducing the level of noise at the installation location, such as within one or more high- or low-frequency acoustic ranges.

Figure 2:
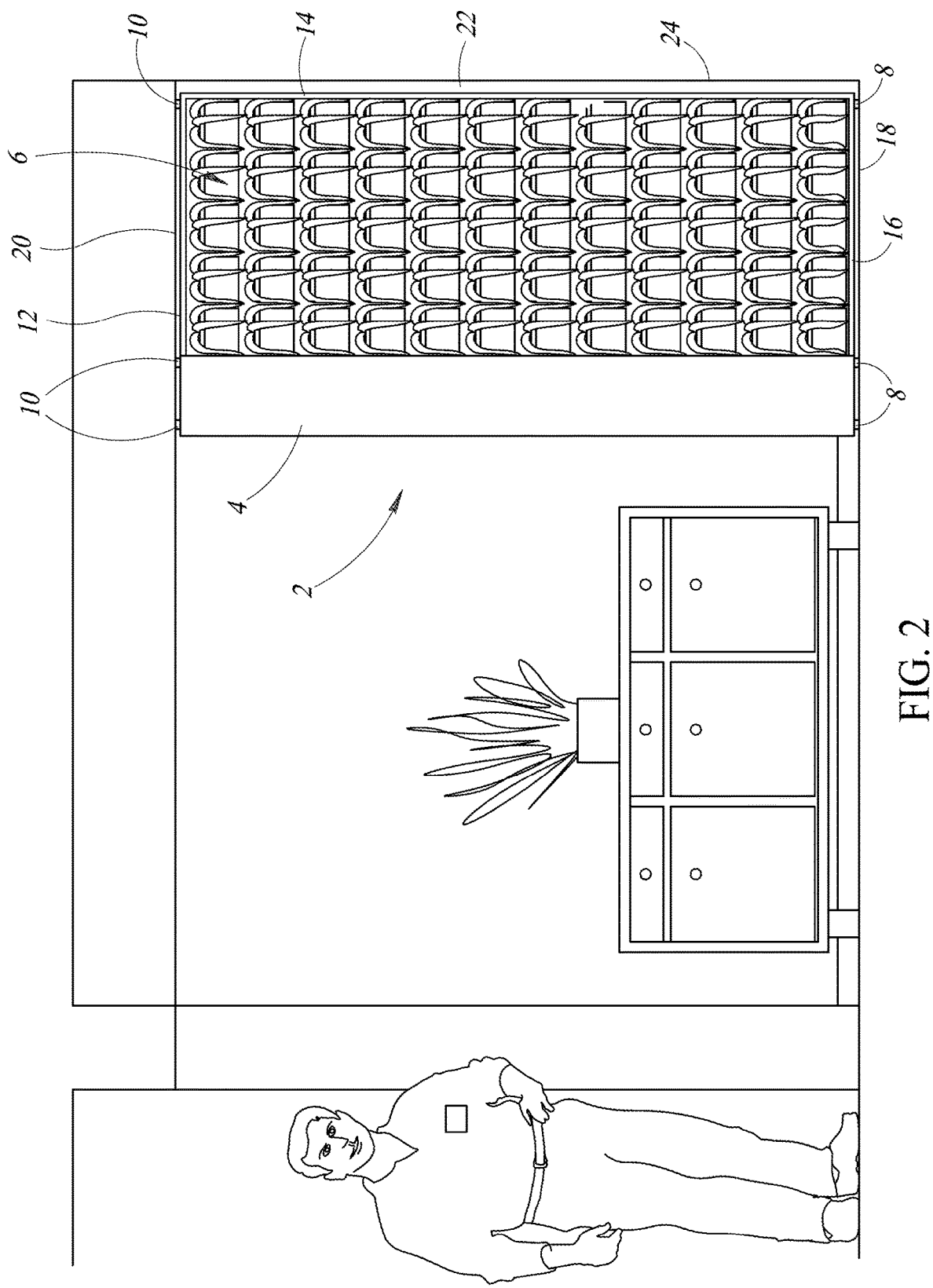
FIG. 2 is a front view of the green wall system of FIG. 1 installed at a second installation location, according to at least one illustrated embodiment.

FIG. 2 illustrates a front view of the green wall system 2 installed at another installation location. As illustrated in FIG. 2, the green wall system 2 includes a top panel 12 located at the top of the system 2, a side panel 14 located at the right side portion of the system 2 opposite the column 4 such that the pots 30 and potted plants 6 are positioned between the column 4 and the side panel 14, and a bottom panel 16 located at the bottom of the system 2 opposite the top panel 12 such that the pots 30 and potted plants 6 are positioned between the top panel 12 and the bottom panel 16. Together, the column 4, the top panel 12, the side panel 14, and the bottom panel 16 can form an outer boundary, frame, or façade that contains the pots 30 and potted plants 6. This outer frame can also be a moisture barrier that prevents excessive moisture from the green wall system 2 from coming into contact with other features of the installation location and thereby causing damage to those features of the installation location.

FIG. 2 also illustrates that the green wall system 2 can include a plurality of feet 8 coupled to the bottom of the column 4 and a bottom surface of the bottom panel 16, to raise the column 4 and bottom panel 16 off of a floor 18 of the installation location. The feet 8 can be made of stainless steel and can have independently adjustable lengths or heights. The green wall system 2 can also include a plurality of spacer elements 10 coupled to the top of the column 4 and to a top surface of the top panel 12, to ensure separation between the column 4 and a soffit or ceiling 20 of the installation location, as well as between the top panel 12 and the ceiling 20. The spacer elements 10 can also couple the green wall system 2 (e.g., the top of the column 4 or the top surface of the top panel 12) to the ceiling 20, such as to prevent the green wall system 2 from tipping over. The green wall system 2 can be positioned such that there is a space or gap 22 between the green wall system 2 (e.g., the side panel 14) and a first wall 24 (e.g., made of drywall or wallboard sold under the trademark SHEETROCK™) of the installation location. The front surface of the utility column 4 seen in FIG. 2 can include markings or signage 86 (see FIG. 1) such as branding, advertisements, workplace notices, electronic signage or displays 88 (see FIG. 1), touchscreens, tablet computing devices, paper or other material dispensers, etc.

Figure 3:
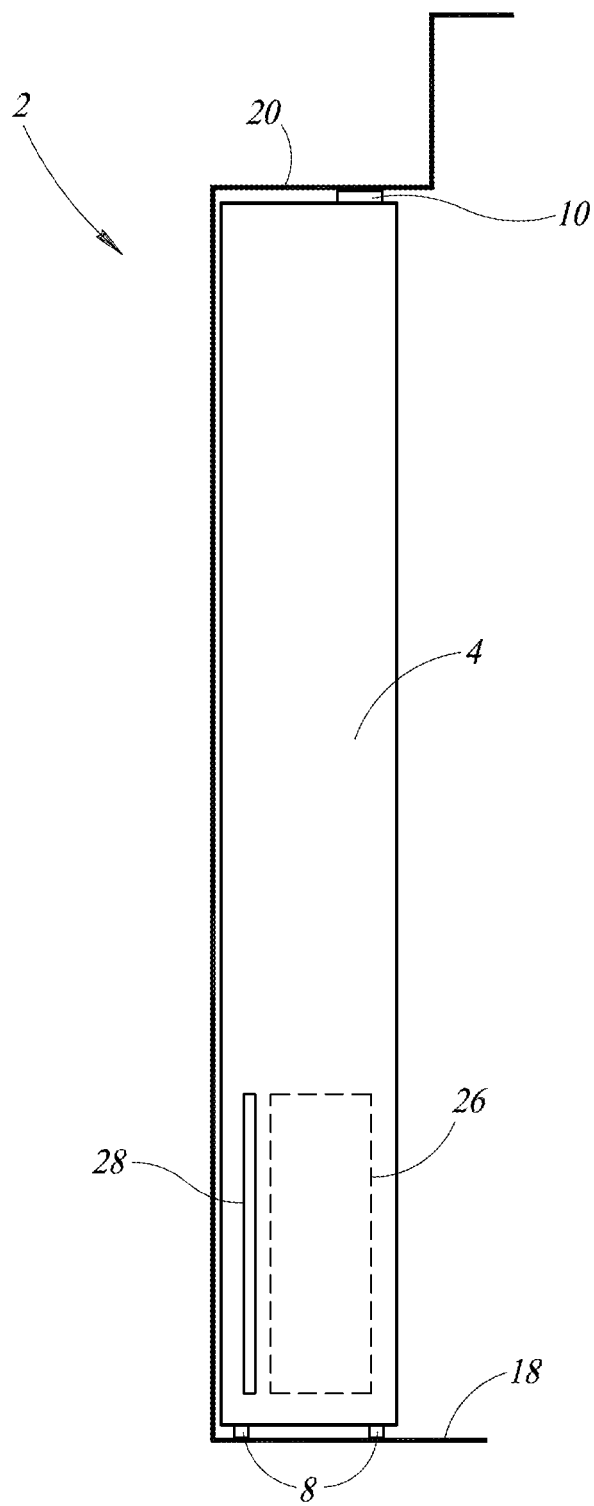
FIG. 3 is a side view of the green wall system of FIGS. 1-2, according to at least one illustrated embodiment.

FIG. 3 illustrates a left side view of the green wall system 2, looking at a left side surface of the utility column 4. FIG. 3 illustrates that the utility column 4 can include one or more vents 28 to allow air to move between an internal space within the utility column 4 and ambient air at the installation location. FIG. 3 also illustrates that the left side of the utility column 4 can include an access panel 26 rotatably coupled to the rest of the utility column 4, such as on hinges, to allow access to the internal space within the utility column 4, such as by a person installing the green wall system 2, maintaining the green wall system 2, checking the status of the green wall system 2, or adding water to a reservoir within the utility column 4. The left side surface of the utility column 4 seen in FIG. 3 can include markings or signage such as branding, advertisements, material dispensers, indentations, protrusions, workplace notices, electronic signage or displays, touchscreens, tablet computing devices, etc.

Figure 4:
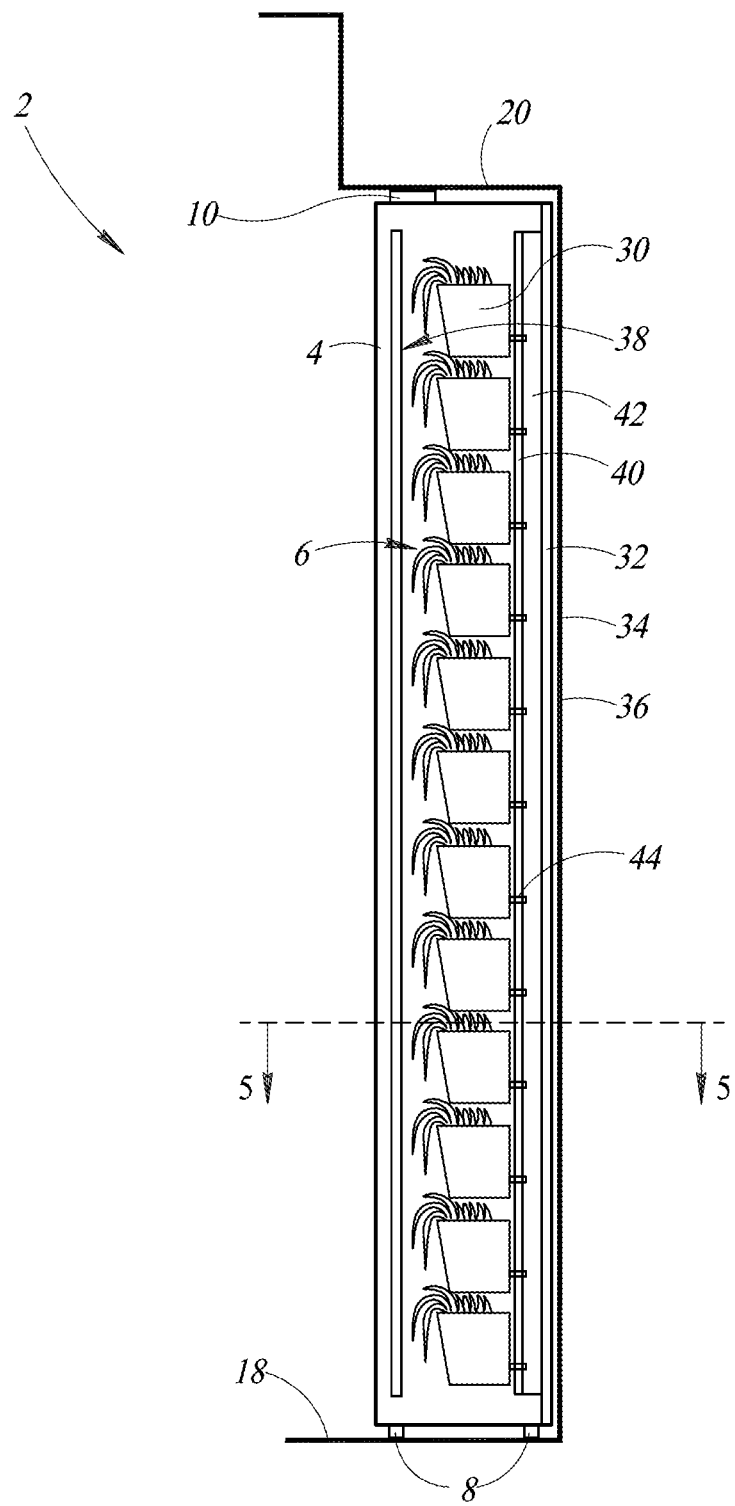
FIG. 4 is a cross-sectional side view of the green wall system of FIGS. 1-3, according to at least one illustrated embodiment.
Figure 5:
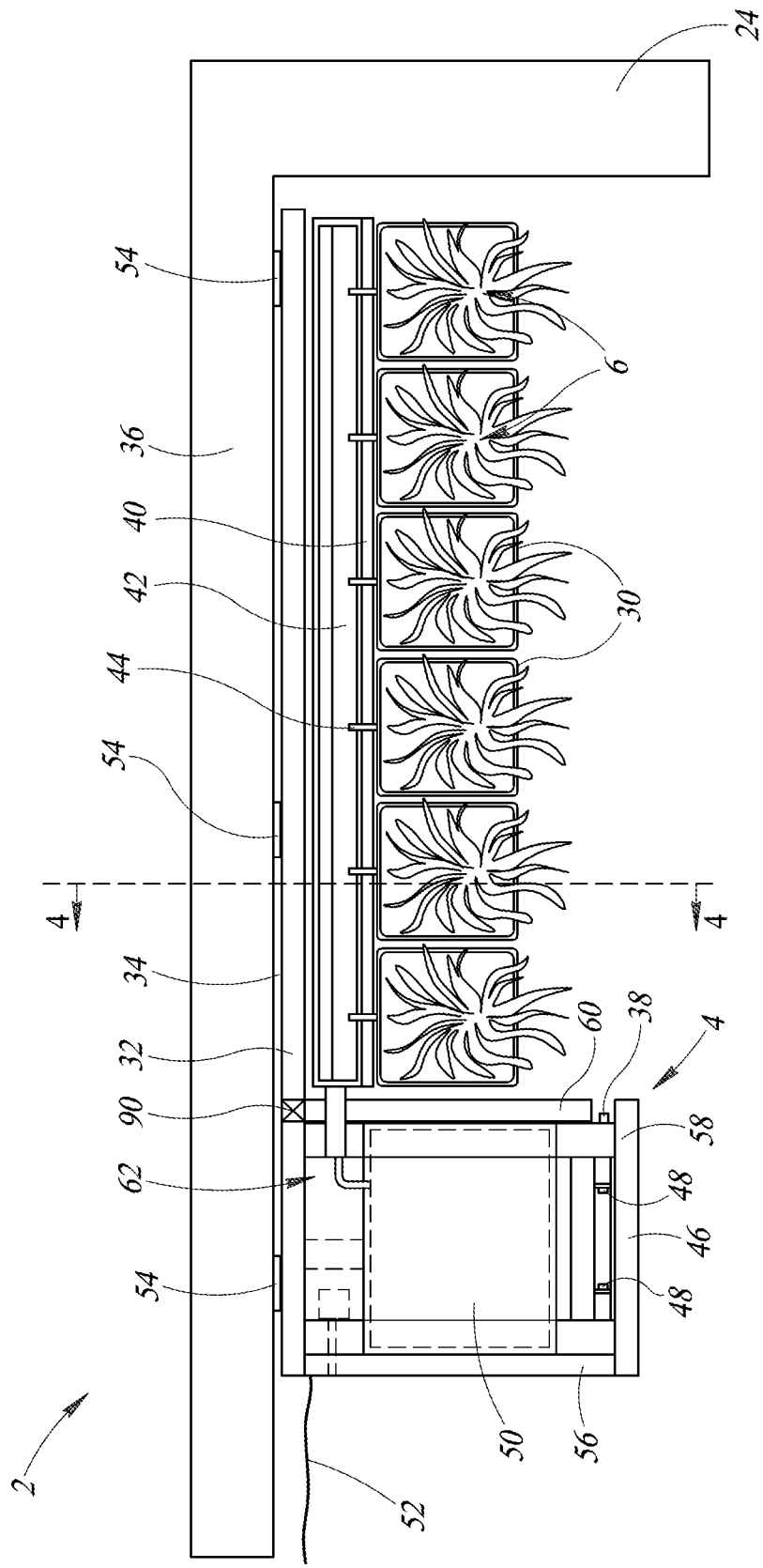
FIG. 5 is a cross-sectional top view of the green wall system of FIGS. 1-4, according to at least one illustrated embodiment.

FIG. 4 illustrates a cross-sectional side view of the green wall system 2 taken along line 4-4 in FIG. 5. FIG. 4 illustrates that the green wall system 2 includes twelve rows of pots 30 and respective potted plants 6. FIG. 4 also illustrates that the green wall system 2 includes a rear panel 32 separated from a second wall 36 (e.g., made of drywall or wallboard sold under the trademark SHEETROCK™) of the installation location by a space or gap 34. The rear panel 32 can be a moisture barrier that prevents excessive moisture from the green wall system 2 from coming into contact with other features of the installation location (such as the second wall 36) and thereby causing damage to those features of the installation location.

The top panel 12, the side panel 14, the bottom panel 16, the rear panel 32, and other components mounted thereto, or any combination or sub-combination of such features that supports the potted plants 6, can be referred to as a "plant support frame" that can be populated with plants or pots or planters with receptacles for holding respective plants. A plant support frame can include boundary panels such as the top panel 12, side panel 14, and bottom panel 16, or can omit such boundary panels. When the green wall system 2 is viewed from the front, an area (or virtual area or viewable area or projected area) within which the potted plants 6 are positioned can be referred to herein as a "green wall area." In the illustrated green wall system 2, such an area can be bounded by the top panel 12, side panel 14, bottom panel 16, and utility column 4, can be viewable from at least a front of the green wall system 2, and can enclose, form a general boundary for, or otherwise support the potted plants 6.

The green wall systems described herein can have planar front surfaces, including a planar front face of the utility column 4 and a substantially planar front surface spanning across the green wall area. In other implementations, however, these surfaces can be non-planar or curved, such as to have any curvature or other desired shape or configuration, a curvature matching any conic section, or convex, concave, protruding, indented, slanted, ovoid, parabolic, cylindrical, or spherical surfaces. The green wall area can be a rectangular area and can have a height spanning between the top panel 12 and the bottom panel 16, a width spanning between the utility column 4 and the side panel 14, and an aspect ratio defined as a height to the width.

FIG. 4 also illustrates that the green wall system 2 can include a support panel, supporting element, rail, or plurality of rails 40 to which each of the pots 30 can be individually and detachably mounted or coupled. Each of the pots 30 can be supported by the support panel or rail 40, such as via mounting brackets. The support panel or rail 40 can be coupled to a fluid distribution system 42, which can itself be coupled to and supported by the rear panel 32. A tube 44 can fluidically couple an internal space within each of the pots 30 to the fluid distribution system 42. The pots 30 can also be mounted to the support panel or rail 40 by the tubes 44, in addition to the mounting brackets described above.

FIG. 4 also illustrates that the green wall system 2 can include a vertical strip lighting assembly 38. The lighting assembly 38 can be an LED strip lighting assembly or other suitable strip lighting assembly, and it can be mounted on or in a right side surface or a right side of the utility column 4. The lighting assembly 38 can be a grow light and wall wash light and can emit light in a desirable range of wavelengths to increase photosynthesis and growth of the potted plants 6. The green wall system 2 can also be provided with a plurality of horizontal strip lighting assemblies including one or more LEDs, such as coupled to the support panel or rail 40, top panel 12, bottom panel 16, or a façade of the green wall system 2, or provided underneath each row of potted plants to illuminate plants both above and below the horizontal strip lighting assemblies. The green wall system can include a plurality of such vertical or horizontal strip lighting assemblies extending between each adjacent pair of columns of pots 30 or between each adjacent pair of rows of pots 30, and can be coupled to the support panel or rail 40, top panel 12, side panel 14, bottom panel 16, or utility column 4.

FIG. 5 illustrates a cross-sectional top view of the green wall system 2, taken along line 5-5 in FIG. 4. FIG. 5 illustrates that the green wall system 2 includes six columns of pots 30 and respective potted plants 6. FIG. 5 also illustrates that the green wall system 2 includes a plurality of spacer elements 54 such as steel mounting cleats 54 to secure the rear panel 32 and thereby the green wall system 2 to the second wall 36 of the installation location. The spacer elements 54 can provide the space or gap 34 between the rear panel 32 and the second wall 36. FIG. 5 also illustrates that the utility column 4 can include a left side panel 56, a front panel 58, and a right side panel 60, which can, together with the rear panel 32, form a structural shell or façade that encloses, protects, and hides other components of the green wall system 2. The panels described herein, such as the panels 12, 14, 16, 32, 56, 58, and 60, can include ¾" plywood with wood veneers selected to match the style of the installation location.

FIG. 5 also illustrates that the structural shell and the utility column 4 can be adjacent to and physically coupled to the plant support frame described above. For example, the rear panel 32 can include a hinge 90 so that the utility column 4 is rotatable about the hinge 90 with respect to the plant support frame, such as to allow an operate access to internal components of the plant support frame. A front surface of the front panel 58, which can be viewable from at least the front of the green wall system 2, can be referred to herein as a front face or a major surface of the utility column 4. The front face can have a rectangular area and can have a height spanning up and down, a width spanning side to side, and an aspect ratio defined as a ratio of the height to the width, wherein the area and the width of the front face are smaller than the area and the width of the green wall area and wherein the aspect ratio of the front face is larger than the aspect ratio of the green wall area.

FIG. 5 also illustrates that the utility column 4 can include one or more internal vertical strip lighting assemblies 48. The lighting assemblies 48 can be LED strip lighting assemblies or other suitable strip lighting assemblies, and can be positioned within the internal space of the utility column 4 adjacent to and behind the front panel 58. A portion of the front panel 58 adjacent to the lighting assemblies 48 can include a white acrylic panel 46 that can be backlit by the internal lighting assemblies 48 and can include the markings or signage such as branding, advertisements, workplace notices, etc., referred to above. For example, the white acrylic panel 46 can have the shape of a logo, or signage can be applied to the front of the white acrylic panel 46 to be illuminated by the lighting assemblies 48. A portion of the front panel 58 can also include the electronic displays, touchscreens, tablet computing devices, etc., referred to above.

Similarly, the utility column 4 can further include one or more internal vertical strip lighting assemblies positioned within the internal space of the utility column 4 adjacent to the left side panel 56, and a portion of the left side panel 56 can include a white acrylic panel, backlit by the lighting assemblies, that can include the markings or signage such as branding, advertisements, workplace notices, etc., referred to above. A portion of the left side panel 56 can also include the electronic displays, touchscreens, tablet computing devices, etc., referred to above.

FIG. 5 also illustrates that a fluid reservoir 50 is positioned within the internal space of the utility column 4. The fluid reservoir 50 can be filled with fluids (e.g., liquids or gasses) such as water, and optionally nutrients for feeding the potted plants 6. The fluid reservoir may, for example, hold at least 12 gallons of fluid, or at least a week's supply of fluid for the green wall system 2. The internal space of the utility column 4 can also house a pump for pumping fluid from the reservoir into the fluid distribution system 42, such as through a conduit 62 that fluidically couples the reservoir 50 to the fluid distribution system 42. The internal space of the utility column 4 can also house one or more fans or diaphragm pumps, operable to circulate air through the internal space of the utility column 4, or through the fluid distribution system 42 to the roots of the potted plants 6. For example, a diaphragm pump can be used to create positive air pressure within the fluid distribution system 42 to increase the plant absorption of contaminants from the air at the installation location.

The internal space of the utility column 4 can also house a temperature control unit such as a heater to heat the fluid (e.g., a liquid such as liquid water) within the reservoir 50, or a cooler to cool the fluid so as to provide the potted plants 6 with water of a constant temperature. The temperature control unit can also cool water in the reservoir 50 to increase a dissolved oxygen content of the water, thereby improving the health of the potted plants and suppressing anaerobic conditions that favor algae and pest build-up. An electric cord and plug 52 (e.g., a standard 3-prong North American 120 volt, 60 Hz electric cord, a standard European electric cord, or a standard 110V electric cord) can extend from a first end thereof configured to be plugged into a standard wall outlet, receptacle, or socket, to a second end thereof within the internal space of the utility column 4. Power drawn from the cord 52 can be used to power the lighting assemblies, the pump, the fans, and other components described elsewhere herein.

Figure 6:
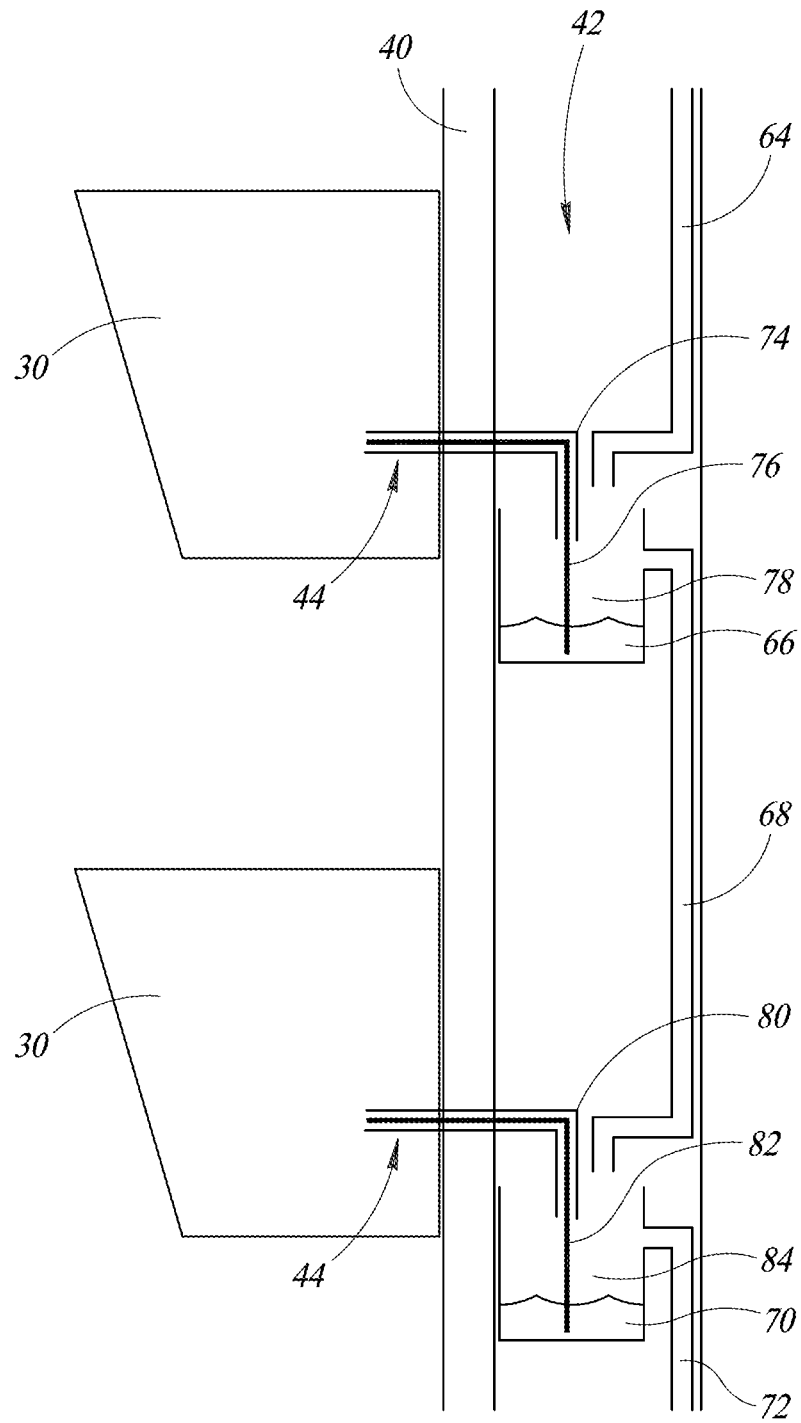
FIG. 6 is a cross-sectional side view of a fluid distribution system of the green wall system of FIGS. 1-5, according to at least one illustrated embodiment.

FIG. 6 illustrates details of one example configuration of the fluid distribution system 42, operable to distribute both liquids and gasses to soil within the pots 30. A pump can be used to pump water from the main reservoir 50, through the conduit 62, and into the fluid distribution system 42, such as through a first supply pipe or tube or conduit 64 into a first cache or holding tank 66. The first supply pipe or tube or conduit 64 and the first cache or holding tank 66 can be located at a top portion of the green wall system 2 to feed the top row of potted plants 6. Water can be pumped into the first cache or holding tank 66 until the water level in the first cache or holding tank 66 reaches an outlet of the first cache or holding tank 66 coupled to a second supply pipe or tube or conduit 68, at which point, the water can flow through the second supply pipe or tube or conduit 68 into a second cache or holding tank 70. The second cache or holding tank 70 can be located underneath the first cache or holding tank 66 to feed the second to the top row of potted plants 6.

Water can be pumped through the first cache or holding tank 66 into the second cache or holding tank 70 until the water level in the second cache or holding tank 70 reaches an outlet of the second cache or holding tank 70 coupled to a third supply pipe or tube or conduit 72, at which point, the water can flow through the third supply pipe or tube or conduit 72 into a third cache or holding tank. The fluid distribution system 42 can include twelve such caches or holding tanks, each to feed a respective one of the rows of the potted plants 6. The twelve caches or holding tanks can be coupled to one another as described above, such that the pump can pump water into the first cache or holding tank 66 such that the water cascades down under gravity through the fluid distribution system 42 to fill each of the caches or holding tanks. The caches or holding tanks advantageously cache water closer to the respective plants in a flow path of the fluid distribution system 42 than the main reservoir 50.

In some cases, each of the caches or holding tanks in the fluid distribution system 42 can include a sensor to detect a water level therein. When one of the sensors indicates that a water level within its respective cache or holding tank is below a threshold level, or when a sensor indicates that the respective cache or holding tank is empty, the pump can be started and a pumping cycle can be commenced to re-fill the caches or holding tanks. In some cases, only the top-most cache or holding tank 66 can include a sensor to detect a water level therein, and when this sensor indicates that a water level within the top-most cache or holding tank 66 is below a threshold level or empty, the pump can be started and a pumping cycle can be commenced to re-fill the top-most cache or holding tank 66.

In some cases, a bottom-most cache or holding tank can include a sensor to detect a water level within the bottom-most cache or holding tank. When the sensor indicates that the water level in the bottom-most cache or holding tank has reached a predetermined level, such as when the bottom-most cache or holding tank is full or about to overflow, the pump can be stopped and the pumping cycle can be terminated. In some cases, the fluid distribution system 42 can include a trough or catch basin at the bottom of the fluid distribution system 42 to catch any excess water that overflows from the bottom-most cache or holding tank. In some cases, water that overflows from the bottom-most cache or holding tank can be communicated back to and re-enter the reservoir 50 positioned within the utility column 4. In some cases, only the top-most cache or holding tank 66 can include a sensor to commence a pumping cycle, as described above, and only the bottom-most cache or holding tank can include a sensor to terminate a pumping cycle, as described above.

An internal space within each pot 30 is coupled to the fluid distribution system 42 via a tube 44. Each tube 44 coupling a pot 30 in the top row of pots 30 to the fluid distribution system 42 includes a first nozzle 74 housing a first wick 76. The first nozzle 74 extends from within the internal space within the pot 30, through the support panel or rail 40, and opens to a first air channel 78 within the fluid distribution system 42. The first wick 76 extends from within the internal space which holds the soil or other growing media within the pot 30, through the first nozzle 74 through the support panel or rail 40, through the first air channel 78, and into the water in the first cache or holding tank 66. The first wick 76 can occupy less than the entire cross-sectional area of the passage through the first nozzle 74. For example, the first wick 76 can occupy less than ¾, or less than ⅔, or less than ½, or less than ⅓, or less than ¼ of the cross-sectional area of the passage through the first nozzle 74. Remaining open space within the first nozzle 74 that is not occupied by the first wick 76 can allow air to pass through the first nozzle 74.

In use, the first wick 76 can absorb water in the first cache or holding tank 66, and wick the water up into the internal space (e.g., soil or other growing media, roots, etc.) within the respective pot 30. The first air channel 78 can be open to the ambient environment of the installation location, and air passing through the first air channel 78 can become entrained within the water in the first wick 76, so that both water and air can be provided, directed, or injected into soil or other growing media within the respective pot 30 through the first wick 76. A fan, such as one of the fans described above, can be used to blow air through the first air channel 78 to increase the entrainment of the air within the water in the first wick 76.

Similarly, each tube 44 coupling a pot 30 in the second to the top row of pots 30 to the fluid distribution system 42 includes a second nozzle 80 housing a second wick 82. The second nozzle 80 extends from within the internal space within the pot 30, through the support panel or rail 40, and opens to a second air channel 84 within the fluid distribution system 42. The second wick 82 extends from within the internal space within the pot 30, through the second nozzle 80 through the support panel or rail 40, through the second air channel 84, and into the water in the second cache or holding tank 70. The second wick 82 can occupy less than the entire cross-sectional area of the passage through the second nozzle 80. For example, the second wick 82 can occupy less than ¾, or less than ⅔, or less than ½, or less than ⅓, or less than ¼ of the cross-sectional area of the passage through the second nozzle 80. Remaining open space within the second nozzle 80 that is not occupied by the second wick 82 can allow air to pass through the second nozzle 80.

In use, the second wick 82 can absorb water in the second cache or holding tank 70, and wick the water up into the internal space within the respective pot 30. The second air channel 84 can be open to the ambient environment of the installation location, and air passing through the second air channel 84 can become entrained within the water in the second wick 82, so that both water and air can be provided, directed, or injected into soil or other growing media within the respective pot 30 through the second wick 82. A fan, such as one of the fans described above, can be used to blow air through the second air channel 84 to increase the entrainment of the air within the water in the second wick 82.

As illustrated in FIG. 6, each cache or holding tank of the fluid distribution system 42 can be positioned at an elevation lower than its respective row of pots 30, and the outlet of each cache or holding tank of the fluid distribution system can be positioned at an elevation equal to or lower than a bottom of the respective row of pots 30. Thus, flooding of the pots 30 can be reduced or eliminated.

In some cases, an electronic display, touchscreen, or computer can be integrated into the green wall system 2, such as into the utility column 4. The electronic display, touchscreen, or computer can have a wireless antenna or wired connector such as a USB port to allow software or firmware to be uploaded thereto. As one example, a tablet computer can be integrated into an exterior of the utility column 4 so that a user can interact with the computer to obtain information about the green wall system 2 or to obtain information about the building or its occupants (e.g., businesses in the building). For example, the computer can be communicatively coupled to the sensors described herein, so that a user can obtain information from the sensors.

In some cases, the potted plants can grow berries, herbs, or other food items, and the computer can be programmed to indicate to a user that the food items are edible or ready to be picked from the potted plants. In some cases, the fluid reservoir 50 can include a sensor to measure a water level in the fluid reservoir 50, and the sensor can be coupled to the computer so that a user can obtain information regarding the water level within the fluid reservoir 50, such as to determine whether the fluid reservoir 50 should be re-filled. In some cases, the computer can be programmed to display an alert when the water level in the fluid reservoir 50 is below a specific, predetermined threshold level, or when the reservoir 50 is empty.

In some cases, the computer can be programmed to track the total usage time of the pump, fans, lights, and other components of the green wall system 2, such as to alert a user when such a component is nearing the end of its expected life. In some cases, the computer can be programmed to track other events such as time(s) at which fertilizer or ammonia is added to the pots 30 (e.g., to inoculate fungus gnats) (if this is done at all), and to alert a user when it is time to perform such events. The computer can be communicatively connected to one or more computer networks, such as the internet, so that a user can access the information stored therein remotely from another computer, and so that the green wall system 2 can wirelessly send notifications or alerts (such as any of the alerts described herein) to a user, such as via a mobile communication device such as a smartphone.

The tablet computer can also be integrated into the exterior of the utility column 4 so that the user can interact with the computer to control the operation of the green wall system 2. For example, the tablet computer can be coupled to the pump, fan(s), and lights described herein, so that a user can control the operation of these components through the computer. The computer can be communicatively connected to the one or more computer networks, such as the internet, so that the user can control the green wall system 2 remotely from another computer.

In some cases, the computer can be programmed to control the green wall system 2 automatically. For example, the computer can be programmed to turn the lighting assemblies on and off at specific times, such as on at nighttime and off during daytime, or off at times when there is sufficient ambient or natural light for the potted plants 6 to grow, and on at times when there is not. As another example, the computer can be programmed to receive signals from the sensors described above, and based on the received signals, to turn the pump and fans on and off at specific, predetermined times. For example, the computer can be programmed to receive an indication from the sensors that the water level in one or more of the caches or holding tanks of the fluid distribution system 42 is below a threshold level, and to turn the pump or the fans on in response.

In some cases, the green wall system 2 can include a network of sensors to allow the green wall system 2 to automatically self-regulate its performance and dynamically adapt to changing environmental conditions, thereby reducing the amount of maintenance required. The green wall system 2 can be coupled to a source of electricity, a source of water (e.g., point-of-use or "POU" water), an HVAC system of an installation location, a computer network such as the internet, such as by Wi-Fi, a computer including an internal timer to facilitate the operation of this sensor network, and a display device, such as the display of a tablet computer, to display output from the sensors.

For example, the green wall system 2 can include one or more environmental sensors such as sensors for measuring or detecting environmental humidity, air quality, dust level, temperature, light (e.g., as received at a top or a bottom of the utility column 4), TVOC, selected specific VOCs such as formaldehyde, benzene, or toluene, $CO_2$, and airborne particulate matter. The green wall system 2 can also include one or more soil sensors or probes such as sensors for measuring moisture levels, pH levels, temperature, or electroconductivity (EC) for nutrient content in the soil. For example, such soil sensors can be used to measure a moisture draw-down rate within the soil, in the presence or in the absence of fan-activated airflow. The draw-down rate can in turn be used to determine or assess a plant's rate of evapotranspiration, providing an indicator of the rates of photosynthesis and CO2 sequestering, and overall plant health. Such soil sensors can be battery-powered and wireless, or wired to a power source, and can be built into the pots 30. Such soil sensors can be positioned within the top row of pots 30 and within the bottom row of pots 30, as well as within pots 30 located between the top and bottom rows of pots 30. In one implementation, soil sensors are located in one of the pots 30 in the top row of pots 30, in one of the pots 30 in the bottom row of pots 30, and in one additional pot 30 between the top and bottom rows of pots 30 for every 18 square feet occupied by the green wall system 2 beyond 18 square feet. The green wall system 2 can also include one or more optical sensors configured to detect, measure or monitor the condition, movement or presence of pests, rodents, disease, insects, other plants, waste materials, trash, or other items within the potted plants 6 or other components of the green wall system 2, or in the environment, location or space where the green wall system 2 is located. An optical sensor also may be used to determine, detect, monitor, or measure the presence of visible or nor-visible light directly or indirectly incident on one or more of the plants 6, pots 30, on any portion of the green wall system 2, or in the environment or space where the green wall system 2 is located.

Different optical or other sensors may have different capabilities as needed or desired for the green wall system 2 or for the environment, location or space where the green wall system 2 is located. One or more optical or other sensors may be included in the green wall system 2 depending on the type of activity within the space, other external conditions (e.g., weather, pollution or air quality, dust creation or presence, presence of a specific gas, human or animal population within the space), etc., which may be constant or which may vary over a given time period (e.g., second, minute, hour, day, week, month) and for which continuous or periodic monitoring, measuring or detection may be needed or desired. In some embodiments, one or more of the sensors may be controlled, configured, calibrated, used or otherwise managed by the green wall system 2 and/or by a remotely located computer or other device.

Various operating parameters of the green wall system 2 (which can be referred to as inputs to the green wall system 2) can be calibrated, adjusted, or manipulated based on the outputs provided by one or more of the sensors. As one example, an air flow rate generated by the fans or diaphragm pump described above can be modified based on the output of the sensors measuring the moisture levels in the soil in the pots 30, the relative humidity of the environment, the temperature of the environment, and the $CO_2$ and VOC levels in the environment, to optimize or improve an air-to-water ratio in the soil in the pots 30, to optimize or improve plant health, or to optimize or improve the capacity of the green wall system 2 to clean the air at the installation location, thereby allowing the installation location to meet ASHRAE 62.1 while cutting down on HVAC expenses. As another example, the air flow rate can be modified based on a schedule, for example, such that the air flow rate is increased for a three-hour period during the night, during periods when poorer air quality is detected, when the plants 6 require reduced or additional air flow, when the human or animal population within the space or environment where the green wall system 2 is located changes unexpectedly, when malodor is detected within the space where the green wall system 2 is located, when the temperature within the space where the green wall system 2 is located exceeds a desired or pre-set temperature, etc.

As another example, addition of nutrients or fertilizers to the pots 30, or prompts or alerts to a user to add nutrients or fertilizers to the pots 30, can be automated based on the output of the sensors measuring the moisture levels, pH levels, nutrient levels, or temperatures in the soil in the pots 30. As another example, the lighting systems described above can be automated or controlled based on the output of the sensors measuring light at the top and bottom of the utility column 4 to optimize photosynthesis or so the lights are on at certain times of the day (e.g., during the night) and off at other times of the day (e.g., during the day).

As yet another example, pumping of water from the reservoir 50 into the fluid distribution system 42 can be automated or controlled based on the output of the sensors measuring the amount of water in each of the caches or holding tanks described above, the moisture level in the soil, and the environmental relative humidity and temperature at the installation location. Further, alerts or prompts to a user to refill the reservoir 50 can be automated or controlled based on the output of the sensors measuring the amount of water in each of the caches or holding tanks described above.

In some cases, environmental or indoor air quality ("IAQ") measurements can be taken for air entering the green wall system 2 and for air exiting the green wall system 2, so as to allow a comparison of these measurements and therefore to allow an evaluation of the capacity of the green wall system 2 to clean the air at an installation location. For example, sensors can be provided to measure $CO_2$, VOC, humidity, air flow speed, and temperature at an entrance of the air to the green wall system 2 or utility column 4 (which, if the green wall system 2 is coupled to an HVAC system, can be within the HVAC ducting coupled to the green wall system 2), as well as at the top, exposed surface of the soil in the pots 30. Corresponding measurements can be compared to evaluate the actual performance or the capacity of the green wall system 2 to clean the air at the installation location.

As a specific example of the performance of the green wall system 2 including the sensors described above, the green wall system 2 can be programmed to initially perform with all operating parameters (e.g., air flow speed, frequency of watering, etc.) at default or baseline levels. As the green wall system is used at an installation location, the green wall system 2 can use the sensors to record, and can store, data regarding the environmental and soil conditions. In some cases, such data can be stored for at least 24 hours, for at least 48 hours, or for at least 72 hours. After the green wall system 2 has begun collecting such data, operating parameters of the green wall system 2 can be modified, improved, or optimized based on the collected data. As examples, the frequency with which the water pump is turned on, the duration of the operation of the water pump, and the air flow rate can be automatically adjusted or calibrated based on the collected data (e.g., based on the previous 24, 48, or 72 hours of data) to optimize environmental air quality or plant growth. Further, specific plant species or cultivars can be selected or assigned based on their performance within the installation location or expected performance within future installation locations.

If the sensors detect that the environmental air has a relatively high humidity level, then the frequency at which the water pump is turned on and the duration for which the water pump pumps water into the fluid distribution system 42 can be decreased. If the sensors detect that the environmental air has relatively high VOC and $CO_2$ levels, then the fans or diaphragm pump can be turned on to increase the air pressure in and the air flow rate through the fluid distribution system 42 and an alert can be sent to a user to refill the reservoir 50. In some cases, the speed of the fan or diaphragm pump can increase until the soil in the pots 30 becomes saturated with air.

In some embodiments, multiple green wall systems 2 can be installed at the same installation location, such as next to one another to form a larger green wall system. The rear of the green wall system 2 is planar and the front of the green wall system 2 is substantially planar, such that the green wall system 2 can be positioned against a straight wall at an installation location. Alternatively, the front or face of a green wall system can be curved, serpentine, angled, etc., as most appropriate based on the geometry at the installation location and the desired aesthetics of the customer.

Many components of the green wall system 2 are provided within the utility column 4, allowing easy access for maintenance, servicing, or repair. Alternatively, any combination of these components can be provided at a rear portion of the green wall system, such as between the fluid distribution system 42 and the rear panel 32, instead. In some implementations, all of the components provided within the utility column 4 of the green wall system 2 can be provided at a rear portion of the green wall system instead, and the green wall system can be provided without a utility column similar to utility column 4. For example, the fluid reservoir 50 can be a large, flat bladder positioned behind the support panel or rail 40 and behind the pots 30 when the pots 30 are coupled to the support panel or rail 40. Such a large, flat bladder can extend from a top of the green wall system to a bottom of the green wall system and from a left side of the green wall system to a right side of the green wall system, or from proximate a top of the green wall system to proximate a bottom of the green wall system and from proximate a left side of the green wall system to proximate a right side of the green wall system.

A method of installing the green wall system 2 can include positioning the green wall system 2 at an installation location, plugging the electric cord 52 into an outlet at the installation location, and filling the fluid reservoir 50 with water and optionally nutrients. The method can also include coupling the pots 30 and respective potted plants 6 to a support panel or rail 40, such as by using mounting brackets. The method can also include securing the green wall system 2 to a wall, such as by securing mounting brackets to the green wall system 2 and to the wall.

The method can include only (or consist of) positioning the green wall system 2 at an installation location, plugging the electric cord 52 into an outlet at the installation location, and filling the fluid reservoir 50 with water or nutrients. The method can include only (or consist of) positioning the green wall system 2 at an installation location, plugging the electric cord 52 into an outlet at the installation location, filling the fluid reservoir 50 with water or nutrients, coupling the pots 30 and respective potted plants 6 to a support panel or rail 40, and securing the green wall system 2 to a wall.

The methods can be performed without coupling the green wall system 2 to an external water reservoir or water source (that is, external to the green wall system 2), and can be performed without the services of an electrician, plumber, HVAC specialist, or other tradesman. The method can be performed by one or more people capable of moving the green wall system 2.

A method of maintaining the green wall system 2 can include performing scheduled maintenance and performing unscheduled maintenance. Performing scheduled maintenance can include performing maintenance on the green wall system 2 at regular intervals and performing unscheduled maintenance can include performing maintenance on the green wall system 2 at irregular intervals.

Performing unscheduled maintenance on the green wall system 2 can include receiving a signal from a computer of the green wall system 2 that the green wall system 2 is in need of maintenance, and then performing the needed maintenance. In some cases, performing unscheduled maintenance on the green wall system 2 can include receiving a signal from the computer that a sensor of the green wall system 2 has indicated that the reservoir 50 is in need of re-filling, opening the access panel 26 to access the reservoir 50, re-filling the reservoir 50, and closing the access panel 26. In some cases, performing unscheduled maintenance on the green wall system 2 includes only (or consists of) receiving the signal from the computer that the sensor of the green wall system 2 has indicated that the reservoir 50 is in need of re-filling, opening the access panel 26 to access the reservoir 50, re-filling the reservoir 50, and closing the access panel 26. Such signals can be received remotely via a mobile communication device such as a smartphone.

FIGS. 7-46 illustrate various additional green wall systems that can include any combination of the features described above for the green wall system 2 or elsewhere herein. In FIGS. 7-46, hatched areas represent regions of the respective green wall systems within which plants, pots, or planters can be positioned, or "green wall areas" similar to the green wall area described above for green wall system 2, and non-hatched areas represent regions of the respective green wall systems that can be occupied by one or more utility columns, or "front faces" similar to the front face described above for green wall system 2. The green wall areas and front faces illustrated in FIGS. 7-46 are indicative of the general boundaries of these shapes. Portions of or a pot or a plant may extend in any direction outside of the boundaries indicated and may not extend all the way to the boundaries depending on how such plants or pots are attached to the green wall system. Thus, description or illustration that such an area has a specific geometric shape does not imply or require that the green wall area has an absolutely smooth boundary, but instead that the area has a shape approximate or generally corresponding to that described and illustrated.

For example, FIG. 7 illustrates a green wall system 100 that includes a utility column having a front face 102 and that includes a plant support frame having or otherwise forming a green wall area 104. The front face 102 and the green wall area 104 are both rectangular with the green wall area 104 positioned on the left of the front face 102 and being smaller than the front face 102. FIG. 8 illustrates a green wall system 106 that includes a utility column having a front face 108 and that includes a plant support frame having or otherwise forming a green wall area 110. The green wall area 110 is rectangular and is positioned at the lower left corner of a larger rectangle comprising both the front face 108 and the green wall area 110.

FIG. 9 illustrates a green wall system 112 that includes a utility column having a front face 114 and that includes a plant support frame having or otherwise forming a green wall area 116. The green wall area 116 is rectangular and is positioned at the upper left corner of a larger rectangle comprising both the front face 114 and the green wall area 116. FIG. 10 illustrates a green wall system 118 that includes a utility column having a front face 120 and that includes a plant support frame having or otherwise forming a green wall area 122. The green wall area 122 comprises two rectangles, the first being positioned to the right of the front face 120 and the second being rectangular and positioned at the upper left corner of a larger rectangle comprising both the front face 114 and the green wall area 116.

Figure 11:
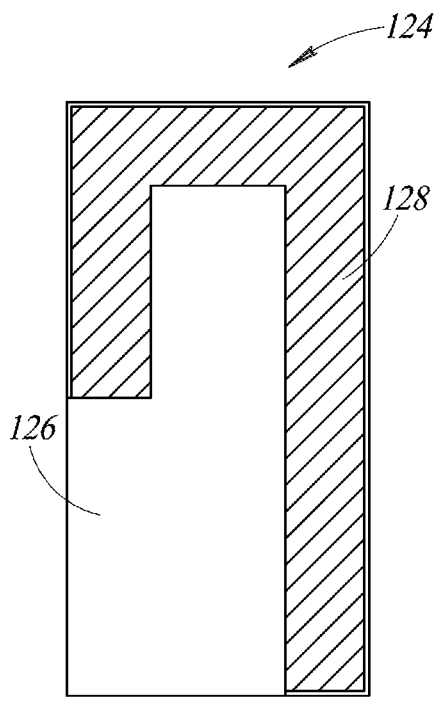
FIG. 11 illustrates another green wall system, according to at least one illustrated embodiment.
Figure 12:
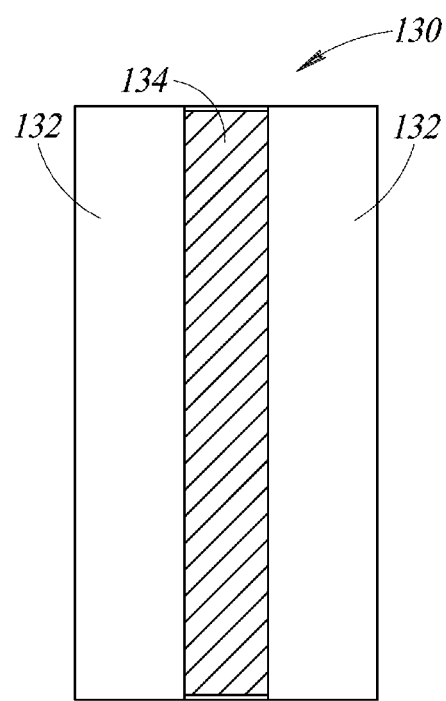
FIG. 12 illustrates another green wall system, according to at least one illustrated embodiment.

FIG. 11 illustrates a green wall system 124 that includes a utility column having a front face 126 and that includes a plant support frame having or otherwise forming a green wall area 128. The green wall area 128 spans the right side, the top portion, and a part of the left side of a larger rectangle comprising both the front face 126 and the green wall area 128. FIG. 12 illustrates a green wall system 130 that includes a utility column having a front face 132 and that includes a plant support frame having or otherwise forming a green wall area 134. The green wall area 104 is rectangular and spans vertically through a middle portion of a larger rectangle including both the front face 132 and the green wall area 134.

Figure 13:
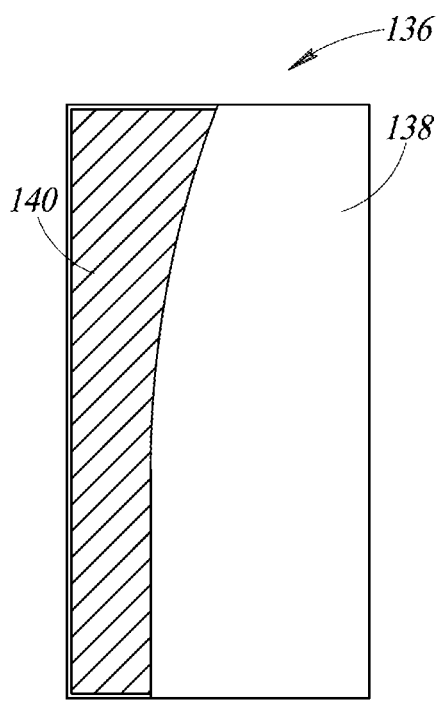
FIG. 13 illustrates another green wall system, according to at least one illustrated embodiment.
Figure 14:
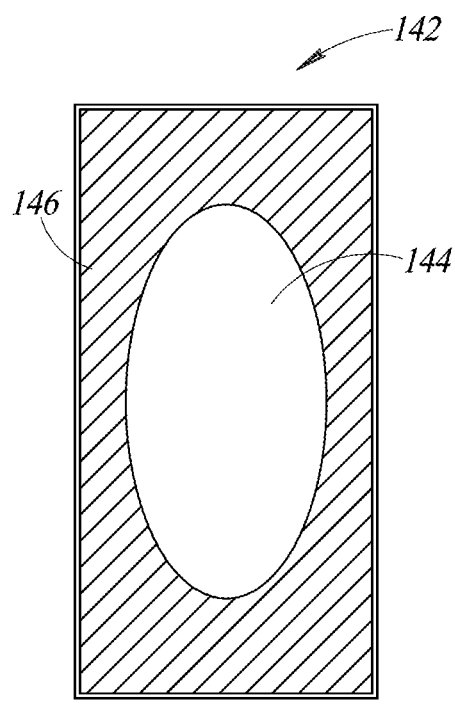
FIG. 14 illustrates another green wall system, according to at least one illustrated embodiment.

FIG. 13 illustrates a green wall system 136 that includes a utility column having a front face 138 and that includes a plant support frame having or otherwise forming a green wall area 140. The green wall area 140 takes up the left portion of a larger rectangle including both the front face 138 and the green wall area 140, and has a width that increases from the bottom to the top of the green wall area 140. FIG. 14 illustrates a green wall system 142 that includes a utility column having a front face 144 and that includes a plant support frame having or otherwise forming a green wall area 146. The front face 144 has an oval shape and takes up a center portion of a larger rectangle including both the front face 144 and the green wall area 146.

Figure 15:
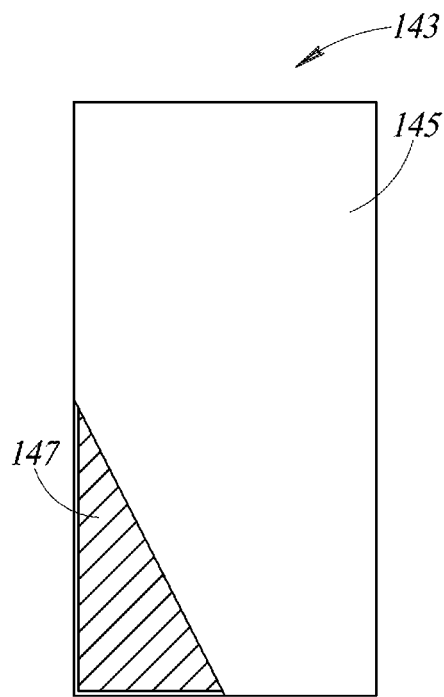
FIG. 15 illustrates another green wall system, according to at least one illustrated embodiment.
Figure 16:
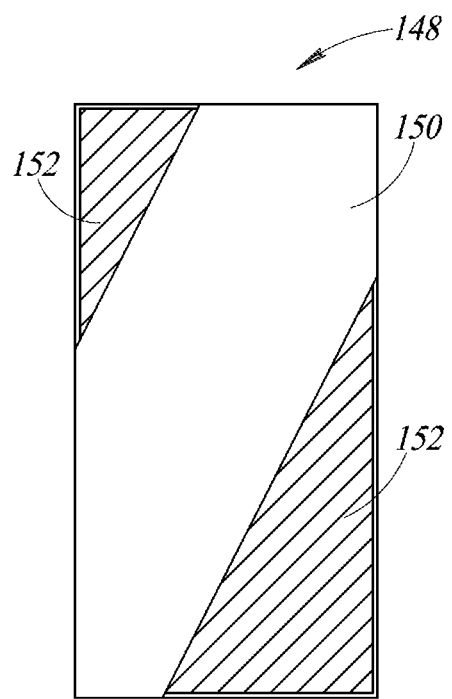
FIG. 16 illustrates another green wall system, according to at least one illustrated embodiment.

FIG. 15 illustrates a green wall system 143 that includes a utility column having a front face 145 and that includes a plant support frame having or otherwise forming a green wall area 147. The green wall area 147 is triangular and takes up a bottom-left corner of a larger rectangle including both the front face 145 and the green wall area 147. FIG. 16 illustrates a green wall system 148 that includes a utility column having a front face 150 and that includes a plant support frame having or otherwise forming a green wall area 152. The green wall area 152 includes two triangles taking up both an upper left corner and a lower right corner of a larger rectangle including both the front face 150 and the green wall area 152.

Figure 17:
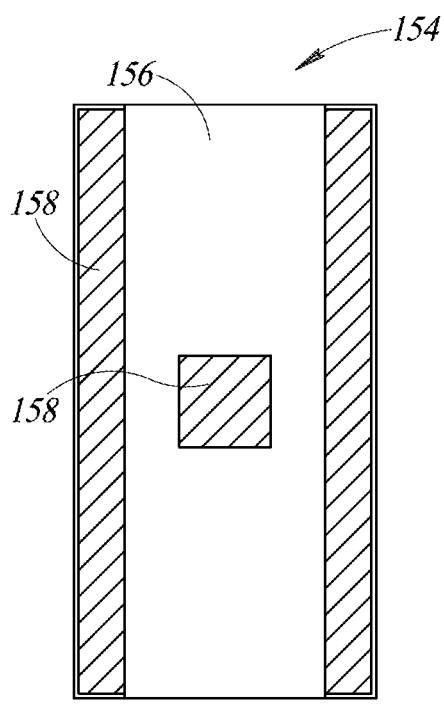
FIG. 17 illustrates another green wall system, according to at least one illustrated embodiment.
Figure 18:
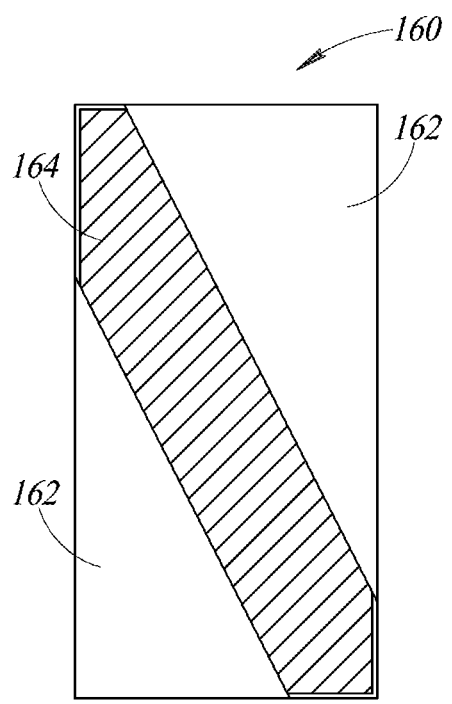
FIG. 18 illustrates another green wall system, according to at least one illustrated embodiment.

FIG. 17 illustrates a green wall system 154 that includes a utility column having a front face 156 and that includes a plant support frame having or otherwise forming a green wall area 158. The green wall area 158 includes three portions, a first portion taking up a left side, a second portion taking up a right side, and a third portion taking up a square at the center of a larger rectangle including both the front face 156 and the green wall area 158. FIG. 18 illustrates a green wall system 160 that includes a utility column having a front face 162 and that includes a plant support frame having or otherwise forming a green wall area 164. The front face 162 includes two triangles taking up both an upper right corner and a lower left corner of a larger rectangle including both the front face 162 and the green wall area 164.

Figure 19:
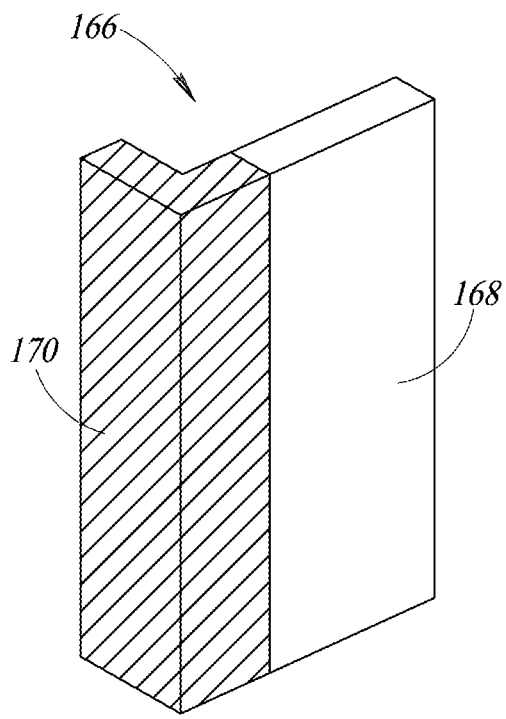
FIG. 19 illustrates another green wall system, according to at least one illustrated embodiment.
Figure 20:
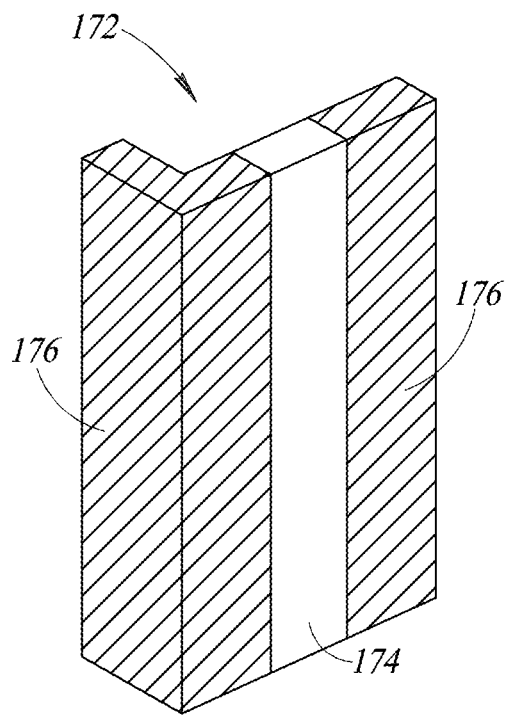
FIG. 20 illustrates another green wall system, according to at least one illustrated embodiment.

FIG. 19 illustrates a green wall system 166 that includes a utility column having a front face 168 and that includes a plant support frame having or otherwise forming a green wall area 170. The green wall system 166 is similar to the green wall system 100 except that the green wall area 170 extends to a left side surface of the green wall system 166 and the left side surface of the green wall system 166 extends rearward from the front face 168 beyond a rear surface of the utility column. FIG. 20 illustrates a green wall system 172 that includes a utility column having a front face 174 and that includes a plant support frame having or otherwise forming a green wall area 176. The green wall system 172 is similar to the green wall system 166 except that a right portion of a front surface of the green wall system 172 includes a portion of the green wall area 176.

Figure 21:
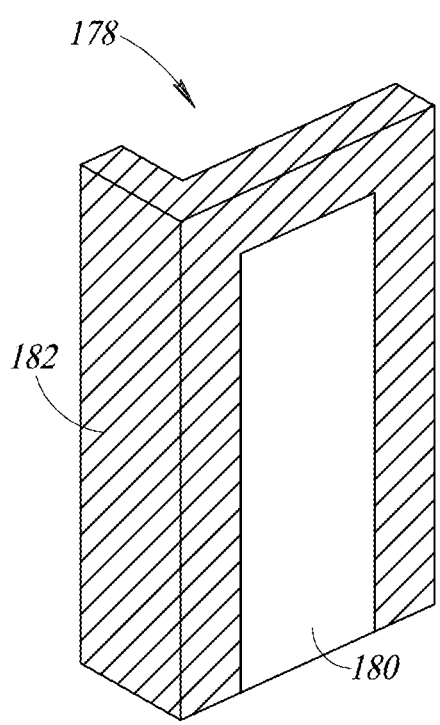
FIG. 21 illustrates another green wall system, according to at least one illustrated embodiment.
Figure 22:
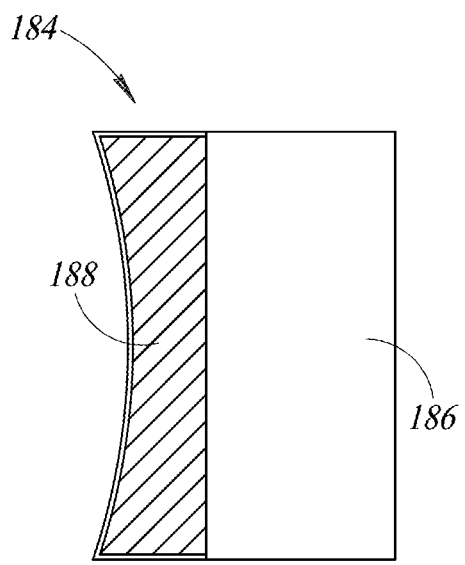
FIG. 22 illustrates another green wall system, according to at least one illustrated embodiment.

FIG. 21 illustrates a green wall system 178 that includes a utility column having a front face 180 and that includes a plant support frame having or otherwise forming a green wall area 182. The green wall system 178 is similar to the green wall system 172 except that a top portion of a front surface of the green wall system 178 includes a portion of the green wall area 182. FIG. 22 illustrates a green wall system 184 that includes a utility column having a front face 186 and that includes a plant support frame having or otherwise forming a green wall area 188. The green wall system 184 is similar to the green wall system 100 except that the green wall area 170 has a concave, curved left side such that its width is greater at the top and the bottom than at a mid-point between the top and bottom.

Figure 23:
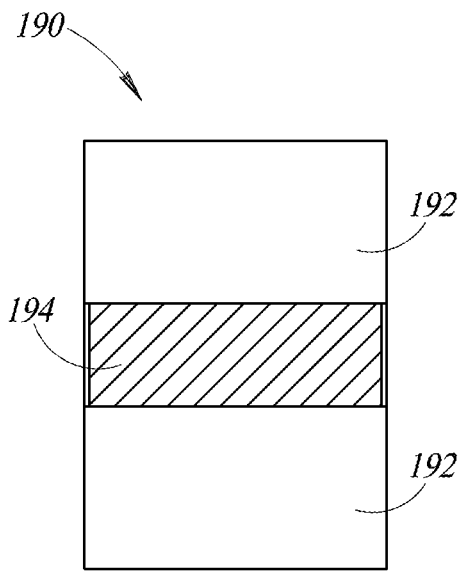
FIG. 23 illustrates another green wall system, according to at least one illustrated embodiment.
Figure 24:
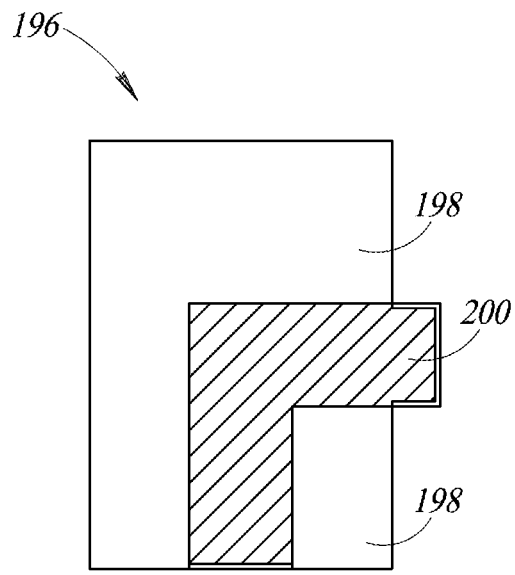
FIG. 24 illustrates another green wall system, according to at least one illustrated embodiment.

FIG. 23 illustrates a green wall system 190 that includes a utility column having a front face 192 and that includes a plant support frame having or otherwise forming a green wall area 194. The green wall area 194 is rectangular and spans horizontally through a middle portion of a larger rectangle including both the front face 192 and the green wall area 194. FIG. 24 illustrates a green wall system 196 that includes a utility column having a front face 198 and that includes a plant support frame having or otherwise forming a green wall area 200. The green wall area 200 extends upward from a middle portion of the bottom of the green wall system 196 to a center point of the green wall system 196, and then to the right and beyond a right edge of the front face 198 of the green wall system 196.

Figure 25:
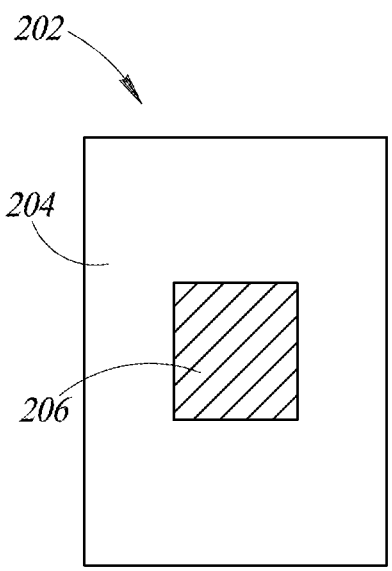
FIG. 25 illustrates another green wall system, according to at least one illustrated embodiment.
Figure 26:
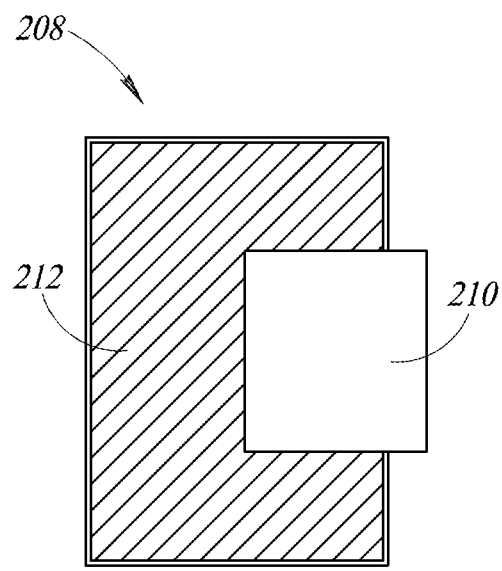
FIG. 26 illustrates another green wall system, according to at least one illustrated embodiment.

FIG. 25 illustrates a green wall system 202 that includes a utility column having a front face 204 and that includes a plant support frame having or otherwise forming a green wall area 206. The green wall area 206 is a square positioned at a center of a larger rectangle including both the front face 204 and the green wall area 206. FIG. 26 illustrates a green wall system 208 that includes a utility column having a front face 210 and that includes a plant support frame having or otherwise forming a green wall area 212. The front face 210 is a square partially surrounded by the green wall area 212 so that the front face 210 extends to the right beyond a right edge of the green wall area 212.

Figure 27:
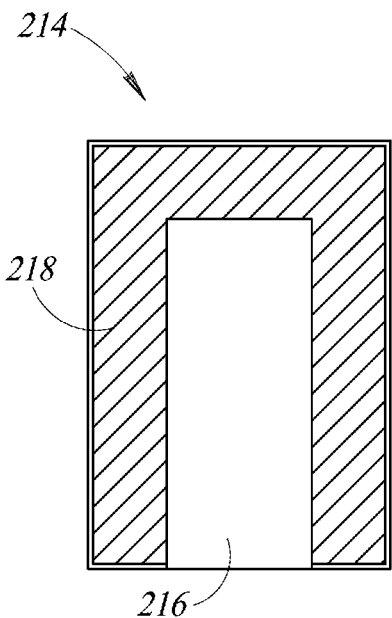
FIG. 27 illustrates another green wall system, according to at least one illustrated embodiment.
Figure 28:
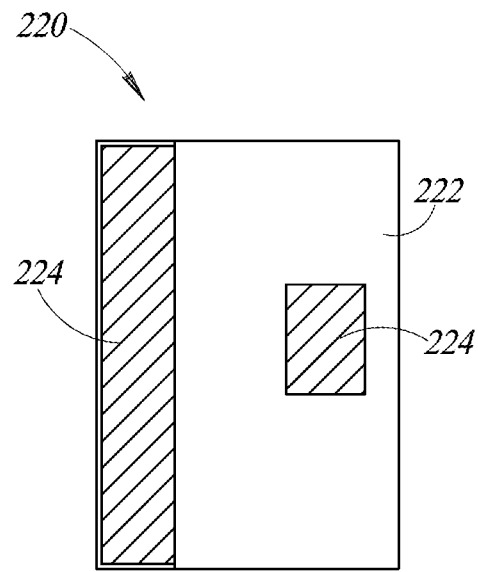
FIG. 28 illustrates another green wall system, according to at least one illustrated embodiment.

FIG. 27 illustrates a green wall system 214 that includes a utility column having a front face 216 and that includes a plant support frame having or otherwise forming a green wall area 218. The green wall area 216 extends along the left side, top side, and right side of a larger rectangle including both the front face 216 and the green wall area 218. FIG. 28 illustrates a green wall system 220 that includes a utility column having a front face 222 and that includes a plant support frame having or otherwise forming a green wall area 224. The green wall area 222 includes a rectangle spanning a left side portion and a square positioned at a center of a larger rectangle including both the front face 222 and the green wall area 224.

Figure 29:
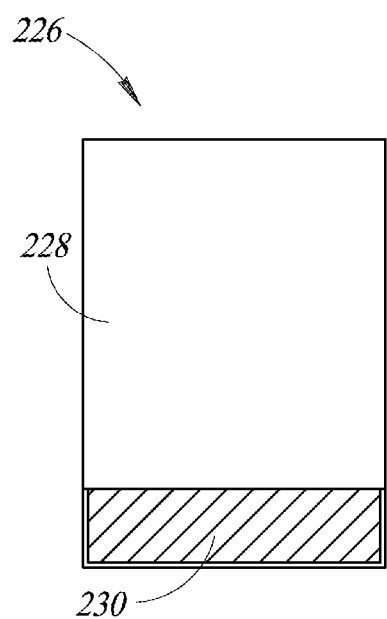
FIG. 29 illustrates another green wall system, according to at least one illustrated embodiment.
Figure 30:
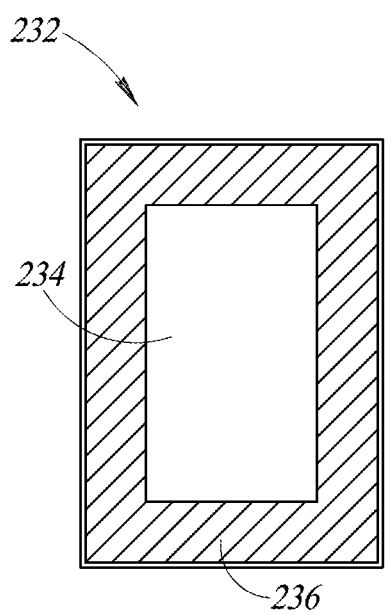
FIG. 30 illustrates another green wall system, according to at least one illustrated embodiment.

FIG. 29 illustrates a green wall system 226 that includes a utility column having a front face 228 and that includes a plant support frame having or otherwise forming a green wall area 230. The green wall area 230 is a rectangle that spans across a bottom portion of a larger rectangle including both the front face 228 and the green wall area 230. FIG. 30 illustrates a green wall system 232 that includes a utility column having a front face 234 and that includes a plant support frame having or otherwise forming a green wall area 236. The front face 234 is a rectangle positioned at a center of a larger rectangle including both the front face 234 and the green wall area 236.

Figure 31:
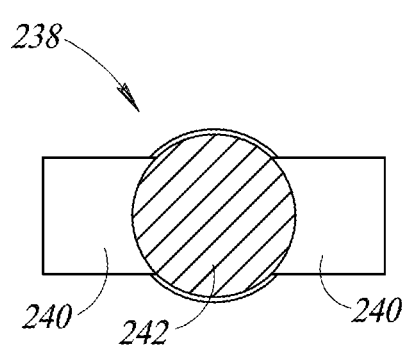
FIG. 31 illustrates another green wall system, according to at least one illustrated embodiment.
Figure 32:
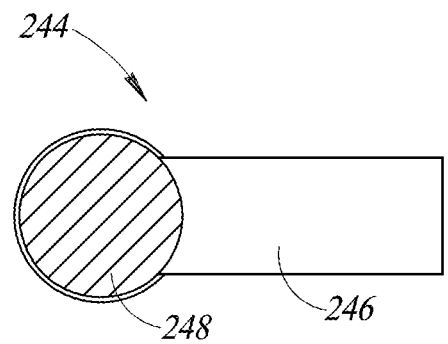
FIG. 32 illustrates another green wall system, according to at least one illustrated embodiment.

FIG. 31 illustrates a green wall system 238 that includes a utility column having a front face 240 and that includes a plant support frame having or otherwise forming a green wall area 242. The front face 240 is a rectangle and the green wall area 242 is a circle superimposed over a center of the rectangular front face 240. FIG. 32 illustrates a green wall system 244 that includes a utility column having a front face 246 and that includes a plant support frame having or otherwise forming a green wall area 248. The front face 246 is a rectangle and the green wall area 248 is a circle superimposed over a left side portion of the rectangular front face 246.

Figure 33:
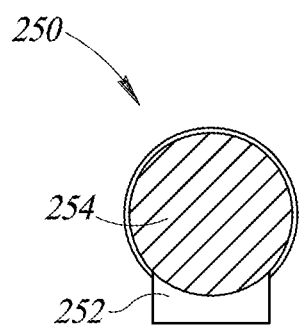
FIG. 33 illustrates another green wall system, according to at least one illustrated embodiment.
Figure 34:
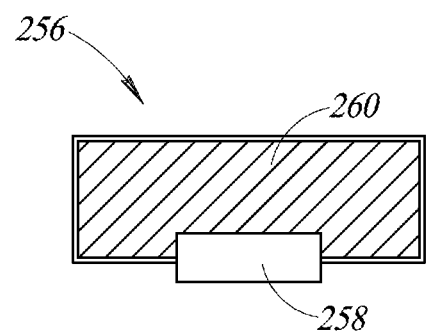
FIG. 34 illustrates another green wall system, according to at least one illustrated embodiment.

FIG. 33 illustrates a green wall system 250 that includes a utility column having a front face 252 and that includes a plant support frame having or otherwise forming a green wall area 254. The front face 252 is a rectangle and the green wall area 242 is a circle superimposed over a top end of the rectangular front face 252. FIG. 34 illustrates a green wall system 256 that includes a utility column having a front face 258 and that includes a plant support frame having or otherwise forming a green wall area 260. The green wall area 260 is a rectangle and the front face 258 is a rectangle partially superimposed over a portion of a bottom end of the rectangular green wall area 260.

Figure 35:
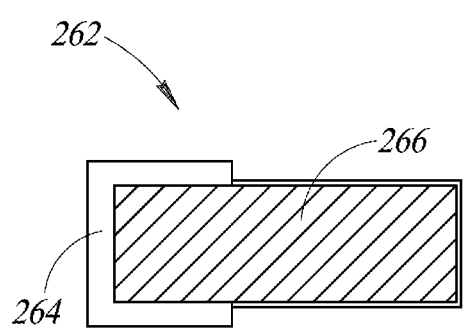
FIG. 35 illustrates another green wall system, according to at least one illustrated embodiment.
Figure 36:
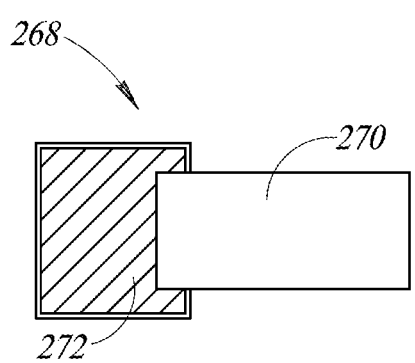
FIG. 36 illustrates another green wall system, according to at least one illustrated embodiment.

FIG. 35 illustrates a green wall system 262 that includes a utility column having a front face 264 and that includes a plant support frame having or otherwise forming a green wall area 266. The green wall area 266 is a rectangle and the front face 264 partially surrounds a left end portion of the rectangular green wall area 266. FIG. 36 illustrates a green wall system 268 that includes a utility column having a front face 270 and that includes a plant support frame having or otherwise forming a green wall area 272. The front face 270 is a rectangle and the green wall area 272 partially surrounds a left end portion of the rectangular green wall area 270.

Figure 37:
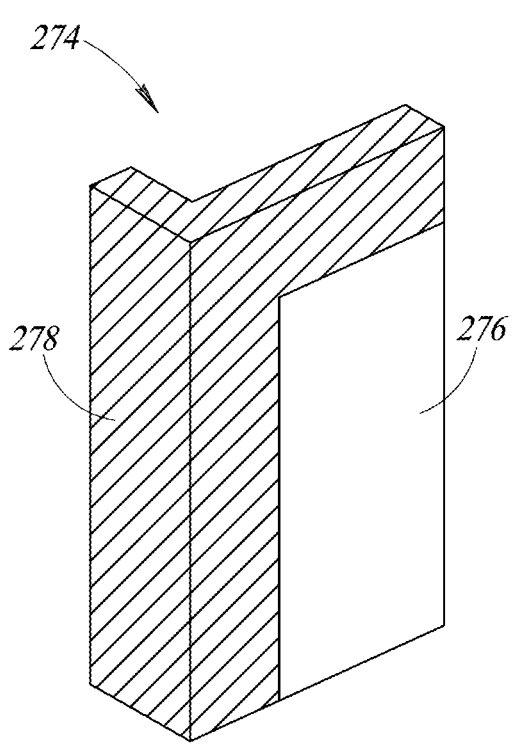
FIG. 37 illustrates another green wall system, according to at least one illustrated embodiment.
Figure 38:
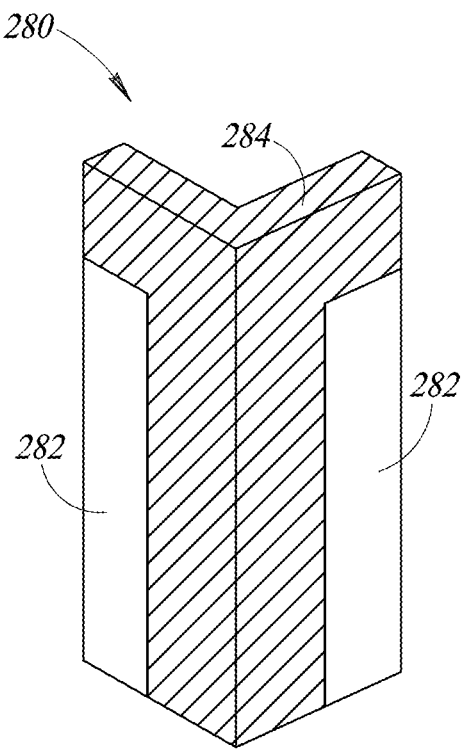
FIG. 38 illustrates another green wall system, according to at least one illustrated embodiment.

FIG. 37 illustrates a green wall system 274 that includes a utility column having a front face 276 and that includes a plant support frame having or otherwise forming a green wall area 278. The green wall system 274 is similar to the green wall system 166 except that a top portion of a front surface of the green wall system 274 includes a portion of the green wall area 278. FIG. 38 illustrates a green wall system 280 that includes a utility column having a front face 282 and that includes a plant support frame having or otherwise forming a green wall area 284. The green wall system 280 is similar to the green wall system 274 except that a portion of the front face 282 spans across a lower left corner of the left side surface of the green wall system 280.

Figure 39:
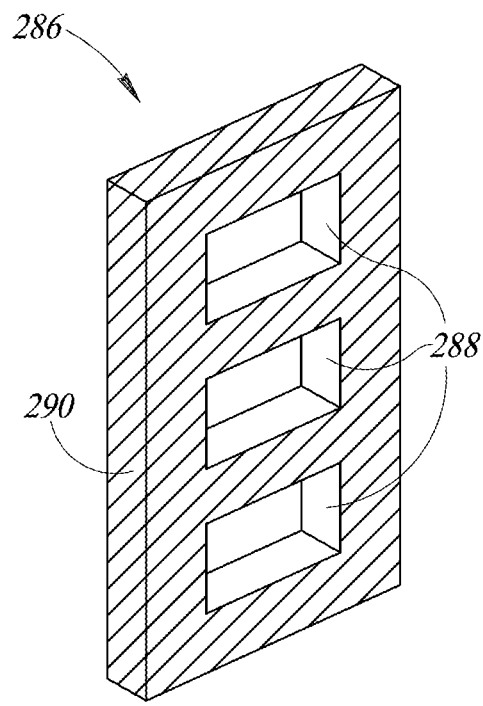
FIG. 39 illustrates another green wall system, according to at least one illustrated embodiment.
Figure 40:
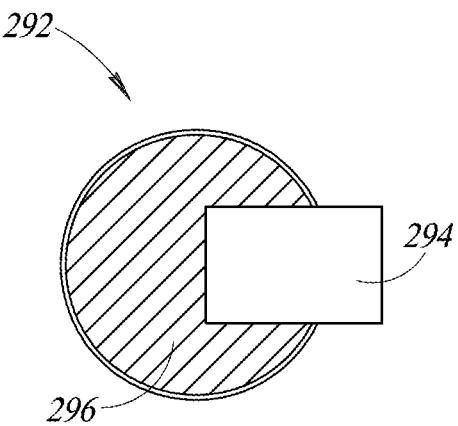
FIG. 40 illustrates another green wall system, according to at least one illustrated embodiment.

FIG. 39 illustrates a green wall system 286 that includes a utility column having a front face 288 and that includes a plant support frame having or otherwise forming a green wall area 290. The green wall system 286 is similar to the green wall system 232 except that the green wall area 290 extends to a left side surface and to a top side surface of the green wall system 286 and the front face 288 includes three rectangles positioned within a central portion of the green wall area 290, the three rectangles spaced above and below one another and having long axes spanning horizontally. FIG. 40 illustrates a green wall system 292 that includes a utility column having a front face 294 and that includes a plant support frame having or otherwise forming a green wall area 296. The green wall area 296 is a circle and the front face 294 is a rectangle superimposed over a right side portion of the circular green wall area 296.

Figure 41:
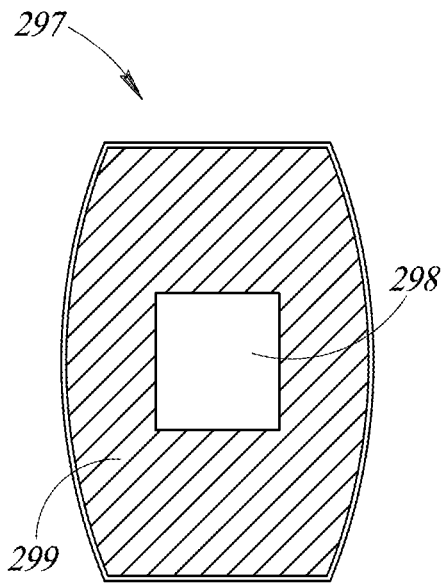
FIG. 41 illustrates another green wall system, according to at least one illustrated embodiment.
Figure 42:
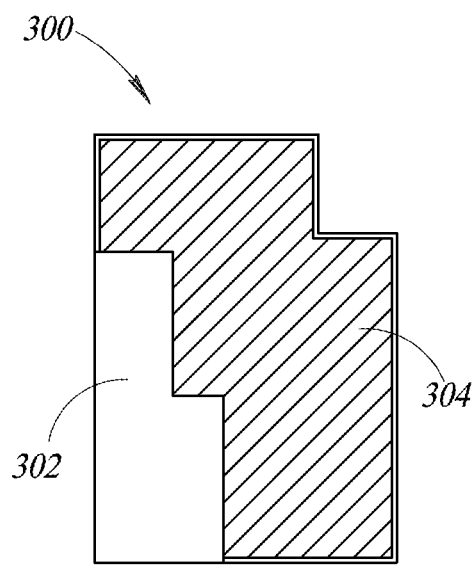
FIG. 42 illustrates another green wall system, according to at least one illustrated embodiment.

FIG. 41 illustrates a green wall system 297 that includes a utility column having a front face 298 and that includes a plant support frame having or otherwise forming a green wall area 299. The front face 298 has a square shape and takes up a center portion of the green wall area 299, which has a flat bottom, a flat top, and convex curved left and right sides. FIG. 42 illustrates a green wall system 300 that includes a utility column having a front face 302 and that includes a plant support frame having or otherwise forming a green wall area 304. The front face 302 has a shape including a primary rectangle and a smaller secondary rectangle projecting upwards from a left top portion of the primary rectangle, and the front face 302 takes up a bottom left portion of a larger shape including both the front face 302 and the green wall area 304, the larger shape including a primary rectangle and a smaller secondary rectangle projecting upwards from a left top portion of the primary rectangle.

Figure 43:
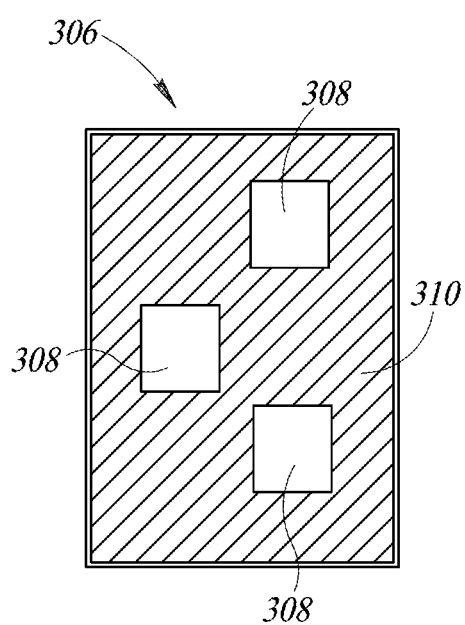
FIG. 43 illustrates another green wall system, according to at least one illustrated embodiment.
Figure 44:
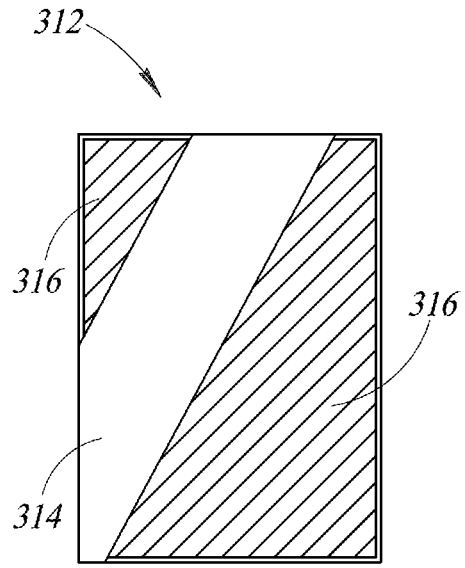
FIG. 44 illustrates another green wall system, according to at least one illustrated embodiment.

FIG. 43 illustrates a green wall system 306 that includes a utility column having a front face 308 and that includes a plant support frame having or otherwise forming a green wall area 310. The front face 308 includes three separate square shapes surrounded by the green wall area 310 so that the front face 308 and the green wall area 310 together form a larger rectangle. FIG. 44 illustrates a green wall system 312 that includes a utility column having a front face 314 and that includes a plant support frame having or otherwise forming a green wall area 316. The front face 314 includes a diagonal strip that extends at an oblique angle to the top and bottom of the green wall system 312 from a bottom left corner to a top of the green wall system 312 across a larger rectangle including both the front face 314 and the green wall area 316.

Figure 45:
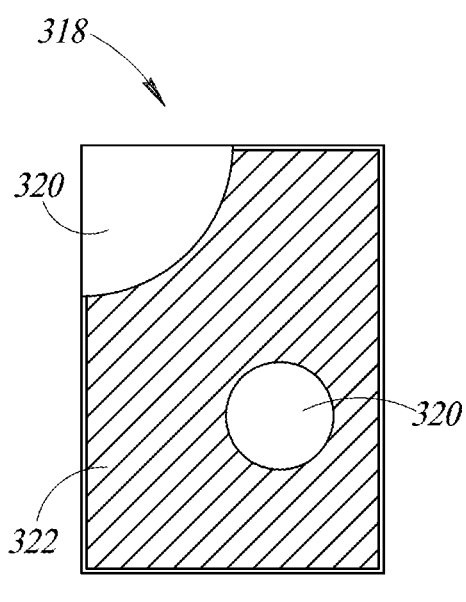
FIG. 45 illustrates another green wall system, according to at least one illustrated embodiment.
Figure 46:
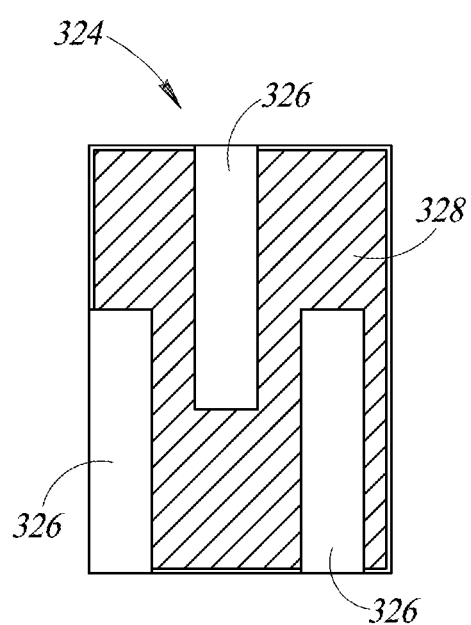
FIG. 46 illustrates another green wall system, according to at least one illustrated embodiment.

FIG. 45 illustrates a green wall system 318 that includes a utility column having a front face 320 and that includes a plant support frame having or otherwise forming a green wall area 322. The front face 320 includes a section of a circle spanning across a top left corner and a circle spanning a central portion of a larger rectangle including both the front face 320 and the green wall area 322. FIG. 46 illustrates a green wall system 324 that includes a utility column having a front face 326 and that includes a plant support frame having or otherwise forming a green wall area 328. The front face 326 includes a first rectangular section covering a bottom portion of the left side of a larger rectangle including the front face 326 and the green wall area 328, a second rectangular section to the right of the first that extends downward from a top of the larger rectangle, and a third rectangular section to the right of the first and second that extends upward from a bottom of the larger rectangle.

In any of the green wall systems described herein, a plant support frame can have a front edge, a back, and a depth that extends perpendicularly with respect to the green wall area from the front edge to the back to delineate a green wall volume. The front edge of the plant support frame can further define a front plane and the front face of the utility column can be parallel to the front plane defined by the front edge of the plant support frame. The front plane of the plant support frame and the front face of the utility column can be coplanar. Potted plants or plants in planters can be positioned rearwardly from the front plane when coupled to the supports in the plant support frame.

In any of the green wall systems described herein, a utility column can have a second face separate from the front face. The second face can be coplanar or not coplanar with the front face, and can have a smaller surface area, a larger surface area, or a surface area about the same size as the front face. The front face and the second face can have the same or different shapes, dimensions, surface coatings, porosities, transparencies, artistic elements, holes or openings, indentations, external protrusions, surface textures, surface colors, surface materials, and/or number of corners.

In any of the green wall systems described herein, a green wall area can have the same shape as or a different shape than a front face of a utility column. In any of the green wall systems described herein, a longest dimension of a green wall area can be longer than, shorter than, or approximately the same size as a longest dimension of a front face of a utility column. In any of the green wall systems described herein, a green wall area In any of the green wall systems described herein, a front face of a utility column may extend from a first location located proximate a bottom of the green wall system to a second location located proximate a top of the green wall system. Proximate the bottom of the green wall system may be less than forty-five, thirty-five, twenty-five, twenty, fifteen, ten, or five percent of a height of the green wall system from the bottom of the green wall system and proximate the top of the green wall system may be less than forty-five, thirty-five, twenty-five, twenty, fifteen, ten, or five percent of the height of the green wall system from the top of the green wall system.

In any of the green wall systems described herein, a front face of a utility column may extend from a first location located proximate a first side of the green wall system to a second location located proximate a second side of the green wall system. Proximate the first side of the green wall system may be less than forty-five, thirty-five, twenty-five, twenty, fifteen, ten, or five percent of a width of the green wall system from the first side of the green wall system and proximate the second side of the green wall system may be less than forty-five, thirty-five, twenty-five, twenty, fifteen, ten, or five percent of the width of the green wall system from the second side of the green wall system.

In any of the green wall systems described herein, a front face of a utility column may extend from a first location located proximate a first side of the green wall system toward a second side of the green wall system and from a second location located proximate a bottom of the green wall system toward a top of the green wall system. Proximate the first side of the green wall system may be less than forty-five, thirty-five, twenty-five, twenty, fifteen, ten, or five percent of a width of the green wall system from the first side of the green wall system and proximate the bottom of the green wall system may be less than forty-five, thirty-five, twenty-five, twenty, fifteen, ten, or five percent of a height of the green wall system from the bottom of the green wall system.

In any of the green wall systems described herein a green wall area may be twice, three times, four times, or five times as large as a front face of a utility column. The front face may be twice, three times, four times, or five times as large as the green wall area. A longest dimension of a green wall area may be parallel to a longest dimension of a front face of a utility column. A longest dimension of a green wall area may be oblique to a longest dimension of a front face of a utility column. A front face of a utility column may have a shape including a first number of corners and a green wall area may have a shape including a second number of corners that either matches, is greater than, or is less than the first number of corners.

In any of the green wall systems described herein, a front face of a utility column may have a concave shape including an indented portion. The front face may include a sensor, a light source, and/or a speaker. The front face may include a curved or an angled portion of the utility column. The green wall area may include a curved or an angled portion of the plant support frame.

In any of the green wall systems described herein, a utility column can include a surface having a white board, a chalkboard, a glow-in-the-dark surface, a photo-catalytic coating, an anti-microbial coating, or a removable top layer built in, such as to display a logo or other information. The walls of the utility column can be made of glass or otherwise be transparent to allow a view of the internal components. An outer surface of the utility column, such as an entire outer wall of the utility column, can include an LED display and the utility column can include speakers to present corresponding imagery and sound, such as to replicate a nature scene.

The utility column can include built-in aroma therapy systems to provide scents that mimic nature such as flowers, which systems can be remotely triggered. The utility column can include a display device, such as described elsewhere herein, to display wellness tips of the day, outdoor or indoor weather and/or air quality information, operating parameters of the green wall system such as a fan speed, a water reservoir level, or an aroma therapy cartridge level, a number of liters of air that have been cleaned over a given time period such as the preceding 24 hours, a time of the day, a symbol that pulses in brightness or intensity to represent that the green wall system is breathing or pulsing, alerts based on air contaminants detected by the green wall system (such as the pulsing symbol turning red until the green wall system has cleaned the air), etc.

Any of the green wall systems described herein can include a power cord to be plugged into an outlet, a Wi-Fi module, a hose to be connected to a point-of-use water supply, ducting to be connected to local HVAC systems, and/or a timer for use by the control systems described herein. The green wall systems can also include a variety of sensors such as to measure indoor air quality, humidity, temperature, light (e.g., a lux sensor), TVOC levels, selected specific VOCs such as formaldehyde, benzene, or toluene, $CO_2$ levels, a fan speed or flow rate of air through the green wall system, and/or fine particulate matter levels (e.g., PM2.5 and/or PM10). Such sensors can be located at the top of a utility column, at the bottom of a utility column, or both. Such sensors can measure the air entering the green wall system and the air leaving the green wall system to provide information regarding the efficacy of the green wall system, and any of the results can be presented to a user through a display as discussed elsewhere herein. The green wall systems can also be connected through the internet to other sources of data such as sources of data providing a local outdoor air temperature, humidity, or air quality, etc.

Any of the green wall systems described herein can also include sensors for measuring parameters of the growing media in the pots holding the potted plants. Such sensors can be wireless and battery powered probes or hard wired sensors built into the pots. One such sensor can be positioned in the top row of plants and another such sensor can be positioned in the bottom row of plants. One additional pot can include a sensor for every 18 square feet of green wall area beyond 18 square feet. Such sensors can measure a moisture level, a pH level, an electroconductivity level, and/or a temperature in the growing media.

In any of the green wall systems described herein, inputs to the system can be calibrated based on the data collected by the sensors regarding the environmental and growing media properties. For example, a fan speed or a resulting air flow rate can be modified (e.g., based on moisture levels in the growing media, relative humidity in the environment, temperature in the environment, air quality in the environment, or based on a schedule) to optimize or improve plant health or stresses on the green wall system without significantly reducing the efficacy of the system.

A green wall system can prompt a user, such as by providing the user with an alert as described elsewhere herein, to add nutrients to the green wall system. Such prompts can be triggered by, for example, moisture levels, pH levels, nutrient levels, or temperature of the growing media. In some cases, a nutrient container can be held within the utility column and upon receiving an alert, a user can remotely activate the utility column to deposit nutrients from the nutrient container to the plants, such as by depositing the nutrients into the water reservoir to be transmitted to the plants by a fluid distribution system as described elsewhere herein.

Any of the green wall systems described herein can include built-in LED lighting underneath each row of potted plants that is transmitted or reflected both upwards and downwards. Such lighting can be turned on or off automatically by the green wall system based on natural light and artificial light conditions, such as can be measured by two light sensors included in the utility column, to optimize or improve photosynthesis. Such LED lighting can also be set to turn on for a set period of time during the day.

Any of the green wall systems described herein can actuate a water pump within a utility column to pump water from a reservoir to plants based on a moisture level in the growing media and the relative humidity and temperature in the environment. The water reservoir can monitor an amount of water remaining in the reservoir and send an alert to a user when the water level reaches a predetermined threshold level, such as 10% full, 1% full, 0.1% full, or 0.01% full.

Any of the green wall systems described herein can include one or more $CO_2$, TVOC, specific VOC, or particulate matter sensors and can be communicatively coupled to a local HVAC system, such as through a BACnet communication protocol. When occupancy within an indoor space increases and the local HVAC system would typically increase its throughput to offset the increased occupancy, the green wall system can ramp up its operation such as by increasing its fan speed to reduce the needed increase in the operation of the local HVAC system, thereby reducing overall expenses in regulating environmental $CO_2$, VOC, or particulate matter levels.

Any of the green wall systems described herein can include hydroponic growing systems rather than, or in addition to, the potted plants growing in soil described above. For example, a hydroponic growing system can include a diaphragm pump that can pump water from a reservoir proximate a bottom end of the green wall system to a top portion of the green wall system and an uppermost row of plants. Such a system can use any one of various suitable hydroponic irrigation techniques, such as flood and drain, steady drip, wicking, or nutrient-film absorption techniques. The pump can be controller either by a human operator or by a computer or timer to initiate a pumping sequence to irrigate the plants on a regular or irregular basis. Timing of irrigation can be based on environmental humidity, temperature, or light conditions. Gravity can then act on the water so that the water drips down from the top portion toward the bottom end of the green wall system through growing media and plant roots.

The growing media can include a variety of substances in varying ratios and combinations, including inert materials such as expanded clay pellets, rockwool, perlite, vermiculite, sterilized sand and other minerals, or organic substrates, including coconut fiber or sphagnum moss. Excess water reaching the bottom end of the green wall system can be returned to the reservoir to be recirculated through the green wall system. Any excess water can be drained, if needed, to a sewer drain rather than being re-circulated. As described above, a water reservoir for the hydroponic growing system can be re-filled manually on a regular basis, or can be connected to a point-of-use water supply. Additional details regarding possible hydroponic systems are described in U.S. Pat. App. Pub. No. 2014/0318011 generally, and in particular at paragraphs 49-52 of the '011 publication. U.S. Pat. App. Pub. No. 2014/0318011 is hereby incorporated herein by reference in its entirety.

Those of skill in the art will recognize that many of the methods or algorithms set out herein may employ additional acts, may omit some acts, and/or may execute acts in a different order than specified. U.S. Provisional Patent Application No. 62/166,559, to which this application claims priority, is hereby incorporated herein by reference in its entirety. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A green wall system comprising:
   a support element and a plurality of pots detachably coupled to the support element, wherein the plurality of pots are arranged in rows;
   a utility column extending from a bottom of the green wall system to a top of the green wall system;
   a fluid reservoir positioned within the utility column;
   a pump positioned within the utility column; and
   one or more environmental sensors configured to detect one or more environmental parameters including at least one of environmental humidity, temperature, TVOC, formaldehyde, benzene, toluene, $CO_2$, and airborne particulate matter, wherein the green wall system is configured to dynamically adjust one or more operating parameters based on detected levels of the one or more environmental parameters;
   wherein the fluid reservoir comprises a plurality of holding tanks disposed within the utility column and each holding tank of the plurality of holding tanks is vertically arranged and fluidically connected to a main reservoir and a conduit, the conduit fluidly connecting an internal space of the detachable pots with an associated holding tank and an air channel, wherein each holding tank of the vertically arranged holding tanks is positioned at an elevation lower than its respective row of detachable pots.

2. The green wall system of claim 1 wherein the pump is coupled to the fluid reservoir to pump fluid from the fluid reservoir to each of the pots when the pots are coupled to the support element.

3. The green wall system of claim 2, further comprising a fluid distribution system coupled to the pump to carry fluid from the pump to each of the pots when the pots are coupled to the support element.

4. The green wall system of claim 1 wherein the support element includes a plurality of rails.

5. The green wall system of claim 4, further comprising a plurality of pots mounted to each of the rails.

6. The green wall system of claim 5, further comprising a potted plant in each of the pots.

7. The green wall system of claim 1, further comprising a backlit acrylic panel in a front portion of the utility column.

8. The green wall system of claim 1 further comprising at least one soil sensor to measure at least one soil parameter selected from the group consisting of: a moisture level, a pH level, and a temperature of soil within the pots.

9. The green wall system of claim 8 wherein the green wall system is further configured to dynamically adjust one or more operating parameters based on output provided by the at least one soil sensor.

10. The green wall system of claim 1 wherein the operating parameters include an air flow rate and a frequency at which the pump is operated.

11. The green wall system of claim 1, further comprising a display configured to display output provided by the one or more environmental sensors.

12. The green wall system of claim 1 wherein the plurality of vertically arranged holding tanks includes an uppermost holding tank and a lowermost holding tank, the uppermost holding tank having an outlet permitting fluid flow to lower holding tanks and the lowermost holding tank, wherein the uppermost holding tank has a first fluid level sensor and the lowermost holding tank has a second fluid level sensor, the first and second fluid level sensors in communication with a control circuit, and wherein a low fluid reading from the first fluid level sensor triggers the pump to start a pumping cycle and a high fluid reading from the second fluid level sensor triggers the pump to end the pumping cycle.

13. The green wall system of claim 1 wherein the conduit is configured to deliver water and air from the associated holding tank and air channel to the internal space of the detachable pots.

14. The green wall system of claim 1 wherein the conduit houses a wick that extends from within the internal space of the detachable pots to the associated holding tank and the air channel to advance the water and the air into the internal space.

15. The green wall system of claim 14 further comprising a fan to flow air through the air channel to increase entrainment of the air in the wick.

16. A green wall system comprising:
   a plant support frame and a plurality of plant pots detachably coupled to the plant support frame, wherein the plurality of plant pots are arranged in rows and delineate a green wall area which is viewable from at least a front of the green wall system, the green wall area populated with plants when the plant pots are detachably coupled to the plant support frame;
   a utility column adjacent to the plant support frame, the utility column having a front face, wherein the front face is a major surface of the utility column which is viewable from at least the front of the green wall system, wherein the green wall area is larger than the front face of the utility column;

a fluid reservoir positioned within the utility column and fluidly coupleable to provide fluid to the plant pots when the plant pots are detachably coupled to the plant support frame; and one or more environmental sensors configured to detect one or more environmental parameters including at least one of environmental humidity, temperature, TVOC, formaldehyde, benzene, toluene, $CO_2$, and airborne particulate matter, wherein the green wall system is configured to dynamically adjust one or more operating parameters based on detected levels of the one or more environmental parameters;

wherein the fluid reservoir includes a plurality of holding tanks within the utility column and each holding tank of the plurality of holding tanks is vertically arranged and fluidically connected to a main reservoir and a conduit, the conduit fluidly connecting an internal space of the plant pots with an associated holding tank and an air channel, wherein each holding tank of the vertically arranged holding tanks is positioned at an elevation lower than its respective row of plant pots.

17. The green wall system of claim 16 wherein the green wall area is a rectangular area and the front face of the utility column is rectangular, and the green wall area has a respective aspect ratio defined as a ratio of a height of the plant support frame and a width of the plant support frame, and the front face of the utility column has a respective aspect ratio defined as a ratio of a height of the front face and a width of the front face, and the respective aspect ratio of the green wall area is smaller than the respective aspect ratio of the front face of the utility column.

18. The green wall system of claim 16 wherein the utility column includes at least one feature selected from the group consisting of:
a second face that is coplanar with the front face;
a second face that is not coplanar with the front face;
a second face that has a smaller surface area than the front face; and
a second face that has a surface area the same size as the front face.

19. The green wall system of claim 16 wherein the green wall area has the same shape as the front face of the utility column.

20. The green wall system of claim 16 wherein the green wall area has a different shape than the front face of the utility column.

21. The green wall system of claim 16 wherein a longest dimension of the green wall area is longer than a longest dimension of the front face of the utility column.

22. The green wall system of claim 16 wherein a longest dimension of the green wall area is shorter than a longest dimension of the front face of the utility column.

23. The green wall system of claim 16 wherein the front face has at least one feature selected from the group consisting of:
a concave shape including an indented portion;
a sensor;
a light source; and
a speaker.

24. The green wall system of claim 16 further comprising signage panels for displaying at least one of branding, advertisements, workplace notices, and electronic signage.

25. A green wall system comprising:
a plant support frame that delineates a green wall area having a width and a height and which is viewable from at least a front of the green wall system, the plant support frame comprising a number of supports and planters that are detachably coupleable to the plant support frame, the planters having receptacles to hold plants at various locations in the green wall area;

a utility column physically adjacent to the plant support frame, the utility column having a front face having a width and a height and which is viewable from at least the front of the green wall system, the width of the green wall area being greater than the width of the front face of the utility column;

a fluid reservoir positioned within the utility column and fluidly coupleable to provide fluid to the plants when the plants are detachably coupled to the plant support frame; and one or more environmental sensors configured to detect one or more environmental parameters including at least one of environmental humidity, temperature, TVOC, formaldehyde, benzene, toluene, $CO_2$, and airborne particulate matter, wherein the green wall system is configured to dynamically adjust one or more operating parameters based on detected levels of the one or more environmental parameters;

wherein the fluid reservoir includes a plurality of holding tanks disposed within the utility column and the plurality of holding tanks is vertically arranged and fluidically connected to a main reservoir and the plurality of vertically arranged holding tanks includes an uppermost holding tank and a lowermost holding tank, the uppermost holding tank having an outlet permitting fluid flow to lower holding tanks and the lowermost holding tank, wherein the uppermost holding tank has a first fluid level sensor and the lowermost holding tank has a second fluid level sensor, the first and second fluid level sensors in communication with a control circuit, and wherein a low fluid reading from the first fluid level sensor triggers the pump to start a pumping cycle and a high fluid reading from the second fluid level sensor triggers the pump to end the pumping cycle.

26. The green wall system of claim 25 wherein the front face extends from a first location located proximate a bottom of the green wall system to a second location located proximate a top of the green wall system.

27. The green wall system of claim 26 wherein the front face extends from within five percent of a height of the green wall system from the bottom of the green wall system to within five percent of the height of the green wall system from the top of the green wall system.

28. The green wall system of claim 25 wherein the front face extends from a first location located proximate a first side of the green wall system to a second location located proximate a second side of the green wall system.

29. The green wall system of claim 25 wherein a longest dimension of the green wall area is parallel to a longest dimension of the front face of the utility column.

30. The green wall system of claim 25 wherein a longest dimension of the green wall area is oblique to a longest dimension of the front face of the utility column.

31. The green wall system of claim 25 wherein the front face includes a curved portion of the utility column.

32. The green wall system of claim 25 wherein the green wall area includes a curved portion of the plant support frame.

33. The green wall system of claim 25 further comprising signage panels for displaying at least one of branding, advertisements, workplace notices, and electronic signage.

34. A green wall system comprising:
a support element and a plurality of pots detachably coupled to the support element, wherein the plurality of pots are arranged in rows;
a utility column extending from a bottom of the green wall system to a top of the green wall system;
a fluid reservoir positioned within the utility column;
a pump positioned within the utility column; and
one or more environmental sensors configured to detect one or more environmental parameters including at least one of environmental humidity, temperature, TVOC, formaldehyde, benzene, toluene, $CO_2$, and airborne particulate matter, wherein the green wall system is configured to dynamically adjust one or more operating parameters based on detected levels of the one or more environmental parameters;
wherein the fluid reservoir includes a plurality of holding tanks that are vertically arranged and fluidically connected to a main reservoir and wherein the plurality of vertically arranged holding tanks includes an uppermost holding tank and a lowermost holding tank, the uppermost holding tank having an outlet permitting fluid flow to lower holding tanks and the lowermost holding tank, wherein the uppermost holding tank has a first fluid level sensor and the lowermost holding tank has a second fluid level sensor, the first and second fluid level sensors in communication with a control circuit, and wherein a low fluid reading from the first fluid level sensor triggers the pump to start a pumping cycle and a high fluid reading from the second fluid level sensor triggers the pump to end the pumping cycle.

35. The green wall system of claim 34 wherein at least one of the holding tanks has an outlet that permits it to a discharge fluid to a lower positioned holding tank once the fluid level has reached the outlet.

36. The green wall system of claim 35 wherein each one of the vertically arranged holding tanks is configured to feed a row of one or more plants.

37. The green wall system of claim 34 further comprising a conduit fluidly connecting an internal space of the detachable pots with an associated holding tank and an air channel, wherein each of the vertically arranged holding tanks is positioned at an elevation lower than its respective row of detachable pots.

38. The green wall system of claim 37 wherein the conduit is configured to deliver water and air from the associated holding tank and air channel to the internal space of the detachable pots.

39. The green wall system of claim 37 wherein the conduit houses a wick that extends from within the internal space of the detachable pots to the holding tank and the air channel to advance the water and the air into the internal space.

40. The green wall system of claim 39 further comprising a fan to flow air through the air channel to increase entrainment of the air in the wick.

* * * * *